(12) United States Patent
Smith et al.

(10) Patent No.: US 7,499,948 B2
(45) Date of Patent: Mar. 3, 2009

(54) SYSTEM AND METHOD FOR WEB-BASED PERSONALIZATION AND ECOMMERCE MANAGEMENT

(75) Inventors: Greg Smith, Westminister, CO (US);
Daryl B. Olander, Longmont, CO (US);
Tom Stamm, Louisville, CO (US);
Robert Bergman, Denver, CO (US);
Thomas A. Cook, Boulder, CO (US)

(73) Assignee: BEA Systems, Inc., San Jose, CA (US)

( * ) Notice: Subject to any disclaimer, the term of this patent is extended or adjusted under 35 U.S.C. 154(b) by 44 days.

(21) Appl. No.: 10/122,599

(22) Filed: Apr. 15, 2002

(65) Prior Publication Data

US 2003/0217332 A1     Nov. 20, 2003

Related U.S. Application Data

(60) Provisional application No. 60/306,509, filed on Jul. 18, 2001, provisional application No. 60/283,977, filed on Apr. 16, 2001.

(51) Int. Cl.
*G06F 7/00*     (2006.01)
(52) U.S. Cl. .................. 707/104.1; 707/100; 715/200; 715/205
(58) Field of Classification Search ................. 715/513, 715/501.1, 205, 200; 707/100, 104.1
See application file for complete search history.

(56) References Cited

U.S. PATENT DOCUMENTS 5,173,939 A    12/1992   Abadi et al. ................. 380/25
5,237,614 A    8/1993   Weiss (Continued)

FOREIGN PATENT DOCUMENTS

EP     1 256 889 A     11/2002

(Continued)

OTHER PUBLICATIONS

Sundsted, Todd, "JNDI Overview, Part 1: An Introduction to Naming Services", JavaWorld, Jan. 2000, pp. 1-6 (downloaded from: www.javaworld.com/javaworld/jw-01-2000/jw-01-howto_p.html).*

(Continued)

*Primary Examiner*—John E Breene
*Assistant Examiner*—Robert Stevens
(74) *Attorney, Agent, or Firm*—Fliesler Meyer LLP.

(57) ABSTRACT

A personalization system that uses rules to adjudicate and characterize a customer, or a customer's actions, and then to personalize a business function, such as a displayed page, based on the outcome of those rules. In one embodiment the invention provides a system for web-based personalization, that allows for personalizing the content or business functioning of a web-based application to reflect the characteristics of a particular user. The system comprises a user profiler, for determining a snapshot of a particular user of a web-based application, a rules editor for inputting a set of rules governing the business functioning of said web-based application, and a rules engine. The system then uses the set of rules to make decisions about the particular user and the business functioning of said web-based application, and to determine the content or business functioning of said web-based application as it applies to that user.

11 Claims, 14 Drawing Sheets

U.S. PATENT DOCUMENTS

| | | | |
|---|---|---|---|
| 5,347,653 A | 9/1994 | Flynn et al. | |
| 5,355,474 A | 10/1994 | Thuraisngham et al. | |
| 5,369,702 A | 11/1994 | Shanton | 713/166 |
| 5,426,747 A | 6/1995 | Weinreb et al. | |
| 5,481,700 A | 1/1996 | Thuraisingham | 395/600 |
| 5,544,322 A | 8/1996 | Cheng et al. | |
| 5,557,747 A | 9/1996 | Rogers et al. | |
| 5,627,764 A * | 5/1997 | Schutzman et al. | 709/207 |
| 5,627,886 A | 5/1997 | Bowman | |
| 5,757,669 A | 5/1998 | Christie et al. | |
| 5,797,128 A | 8/1998 | Birnbaum | |
| 5,802,253 A * | 9/1998 | Gross et al. | 706/47 |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,848,396 A | 12/1998 | Gerace | 705/10 |
| 5,867,667 A | 2/1999 | Butman et al. | |
| 5,872,928 A | 2/1999 | Lewis et al. | |
| 5,889,953 A | 3/1999 | Thebaut et al. | |
| 5,913,061 A * | 6/1999 | Gupta et al. | 719/310 |
| 5,918,210 A | 6/1999 | Rosenthal et al. | |
| 5,954,798 A | 9/1999 | Shelton et al. | |
| 5,956,400 A | 9/1999 | Chaum et al. | |
| 5,966,707 A | 10/1999 | Van Huben et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,014,647 A * | 1/2000 | Nizzari et al. | 705/39 |
| 6,029,144 A | 2/2000 | Barrett et al. | |
| 6,029,182 A * | 2/2000 | Nehab et al. | 715/523 |
| 6,047,279 A * | 4/2000 | Barrack et al. | 706/60 |
| 6,054,910 A | 4/2000 | Tada et al. | |
| 6,055,515 A | 4/2000 | Consentino et al. | |
| 6,055,637 A | 4/2000 | Hudson et al. | |
| 6,073,242 A | 6/2000 | Hardy et al. | |
| 6,083,276 A | 7/2000 | Davidson et al. | 717/1 |
| 6,098,173 A | 8/2000 | Elgressy et al. | |
| 6,108,687 A | 8/2000 | Craig | |
| 6,122,647 A | 9/2000 | Horowitz et al. | |
| 6,141,010 A * | 10/2000 | Hoyle | 715/854 |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A * | 12/2000 | Austin | 707/10 |
| 6,158,010 A | 12/2000 | Moriconi et al. | |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | 713/201 |
| 6,182,277 B1 | 1/2001 | DeGroot et al. | |
| 6,185,587 B1 | 2/2001 | Bernardo et al. | |
| 6,202,066 B1 | 3/2001 | Barkley et al. | |
| 6,202,157 B1 | 3/2001 | Brownlie et al. | |
| 6,202,207 B1 | 3/2001 | Donohue | |
| 6,209,101 B1 | 3/2001 | Mitchem et al. | |
| 6,216,231 B1 | 4/2001 | Stubblebine | |
| 6,219,680 B1 | 4/2001 | Bernardo et al. | 705/501 |
| 6,226,745 B1 | 5/2001 | Wiederhold | 713/200 |
| 6,230,199 B1 | 5/2001 | Revashetti et al. | 709/224 |
| 6,236,977 B1 | 5/2001 | Verba et al. | 705/14 |
| 6,236,978 B1 * | 5/2001 | Tuzhilin | 705/26 |
| 6,241,608 B1 * | 6/2001 | Torango | 463/27 |
| 6,243,747 B1 | 6/2001 | Lewis et al. | |
| 6,253,321 B1 | 6/2001 | Nikander et al. | |
| 6,260,050 B1 * | 7/2001 | Yost et al. | 715/501.1 |
| 6,269,393 B1 * | 7/2001 | Yost et al. | 709/201 |
| 6,269,456 B1 | 7/2001 | Hodges et al. | |
| 6,275,941 B1 | 8/2001 | Saito et al. | |
| 6,278,449 B1 | 8/2001 | Sugiarto et al. | 345/334 |
| 6,285,366 B1 | 9/2001 | Ng et al. | |
| 6,285,985 B1 * | 9/2001 | Horstmann | 705/14 |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,308,163 B1 | 10/2001 | Du et al. | 705/8 |
| 6,317,868 B1 | 11/2001 | Grimm et al. | |
| 6,327,573 B1 | 12/2001 | Walker et al. | 705/14 |
| 6,327,574 B1 | 12/2001 | Kramer et al. | 705/14 |
| 6,327,594 B1 | 12/2001 | Van Huben et al. | |
| 6,327,618 B1 | 12/2001 | Ahlstrom et al. | |
| 6,327,628 B1 | 12/2001 | Anuff et al. | |
| 6,339,423 B1 | 1/2002 | Sampson et al. | |
| 6,339,826 B2 | 1/2002 | Hayes et al. | |
| 6,341,352 B1 | 1/2002 | Child et al. | |
| 6,349,290 B1 * | 2/2002 | Horowitz et al. | 705/35 |
| 6,353,839 B1 | 3/2002 | King et al. | 707/513 |
| 6,353,886 B1 | 3/2002 | Howard et al. | |
| 6,360,363 B1 | 3/2002 | Moser et al. | |
| 6,377,973 B2 * | 4/2002 | Gideon | 709/203 |
| 6,381,579 B1 | 4/2002 | Gervais et al. | |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,442,577 B1 | 8/2002 | Britton et al. | 707/513 |
| 6,457,007 B1 | 9/2002 | Kikuchi et al. | |
| 6,460,141 B1 | 10/2002 | Olden | 713/201 |
| 6,466,239 B2 | 10/2002 | Ishikawa | |
| 6,473,791 B1 | 10/2002 | Al-Ghosein et al. | |
| 6,477,543 B1 | 11/2002 | Huang et al. | |
| 6,477,575 B1 * | 11/2002 | Koeppel et al. | 709/224 |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,510,513 B1 | 1/2003 | Danieli | |
| 6,519,647 B1 | 2/2003 | Howard et al. | |
| 6,530,024 B1 | 3/2003 | Proctor | |
| 6,539,375 B2 * | 3/2003 | Kawasaki | 707/5 |
| 6,571,247 B1 | 5/2003 | Danno et al. | 707/100 |
| 6,574,660 B1 * | 6/2003 | Pashupathy et al. | 709/217 |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel et al. | |
| 6,587,849 B1 * | 7/2003 | Mason et al. | 707/5 |
| 6,587,876 B1 | 7/2003 | Mahon et al. | |
| 6,606,304 B1 * | 8/2003 | Grinter et al. | 370/252 |
| 6,615,218 B2 | 9/2003 | Mandal et al. | |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo | |
| 6,697,805 B1 | 2/2004 | Choquier et al. | |
| 6,721,888 B1 | 4/2004 | Liu et al. | |
| 6,732,144 B1 | 5/2004 | Kizu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | |
| 6,751,657 B1 * | 6/2004 | Zothner | 709/220 |
| 6,751,659 B1 | 6/2004 | Fenger et al. | |
| 6,754,672 B1 * | 6/2004 | McLauchlin | 707/104.1 |
| 6,757,689 B2 * | 6/2004 | Battas et al. | 707/101 |
| 6,757,698 B2 | 6/2004 | McBride et al. | |
| 6,769,095 B1 | 7/2004 | Brassard et al. | |
| 6,769,118 B2 | 7/2004 | Garrison et al. | |
| 6,775,658 B1 * | 8/2004 | Zothner | 706/47 |

| Patent | Date | Inventor |
|---|---|---|
| 6,779,002 B1 | 8/2004 | Mwaura |
| 6,789,202 B1 | 9/2004 | Ko et al. |
| 6,834,284 B2 | 12/2004 | Acker et al. |
| 6,856,999 B2 | 2/2005 | Flanagin et al. |
| 6,857,012 B2 | 2/2005 | Sim et al. |
| 6,865,549 B1 | 3/2005 | Connor |
| 6,871,186 B1* | 3/2005 | Tuzhilin et al. ............... 705/26 |
| 6,880,005 B1 | 4/2005 | Bell et al. |
| 6,889,222 B1* | 5/2005 | Zhao ............................ 707/3 |
| 6,889,564 B1* | 5/2005 | Marcotte et al. ......... 73/861.74 |
| 6,901,403 B1 | 5/2005 | Bata et al. |
| 6,904,408 B1* | 6/2005 | McCarthy et al. ............... 705/2 |
| 6,904,454 B2 | 6/2005 | Stickler |
| 6,920,457 B2 | 7/2005 | Pressmar |
| 6,922,695 B2 | 7/2005 | Skufca et al. |
| 6,934,934 B1 | 8/2005 | Osborne et al. |
| 6,957,261 B2 | 10/2005 | Lortz |
| 6,961,897 B1 | 11/2005 | Peel et al. |
| 6,965,999 B2 | 11/2005 | Fox et al. |
| 6,970,876 B2 | 11/2005 | Hotti et al. |
| 6,978,379 B1 | 12/2005 | Goh et al. |
| 6,985,915 B2 | 1/2006 | Somalwar et al. |
| 6,988,138 B1 | 1/2006 | Alcorn et al. |
| 7,003,578 B2 | 2/2006 | Kanada et al. |
| 7,035,879 B2 | 4/2006 | Shi et al. |
| 7,035,944 B2 | 4/2006 | Fletcher et al. |
| 7,047,522 B1 | 5/2006 | Dixon et al. |
| 7,054,910 B1 | 5/2006 | Nordin et al. |
| 7,062,490 B2 | 6/2006 | Adya et al. |
| 7,062,511 B1 | 6/2006 | Poulsen |
| 7,080,000 B1 | 7/2006 | Cambridge |
| 7,085,755 B2 | 8/2006 | Bluhm et al. |
| 7,089,584 B1 | 8/2006 | Sharma |
| 7,093,200 B2 | 8/2006 | Schreiber et al. |
| 7,093,261 B1 | 8/2006 | Harper et al. |
| 7,093,283 B1 | 8/2006 | Chen et al. |
| 7,103,564 B1* | 9/2006 | Ehnebuske et al. ............ 705/14 |
| 7,124,413 B1 | 10/2006 | Klemm et al. |
| 7,165,041 B1 | 1/2007 | Guheen et al. |
| 7,174,563 B1 | 2/2007 | Brownlie et al. |
| 7,185,192 B1 | 2/2007 | Kahn |
| 7,200,563 B1* | 4/2007 | Hammitt et al. ................. 705/7 |
| 7,219,140 B2 | 5/2007 | Marl et al. |
| 7,260,551 B2* | 8/2007 | Phillips ........................ 705/10 |
| 2001/0014868 A1* | 8/2001 | Herz et al. .................... 705/14 |
| 2001/0032128 A1 | 10/2001 | Kepecs |
| 2001/0034771 A1 | 10/2001 | Hutsch et al. |
| 2001/0047485 A1 | 11/2001 | Brown et al. |
| 2002/0004848 A1 | 1/2002 | Sudarshan et al. |
| 2002/0005867 A1 | 1/2002 | Gvily |
| 2002/0019827 A1 | 2/2002 | Shiman et al. |
| 2002/0029296 A1 | 3/2002 | Anuff et al. |
| 2002/0059394 A1 | 5/2002 | Sanders |
| 2002/0062451 A1 | 5/2002 | Scheidt et al. |
| 2002/0067370 A1 | 6/2002 | Forney et al. |
| 2002/0069261 A1* | 6/2002 | Bellare et al. ................. 709/218 |
| 2002/0087571 A1 | 7/2002 | Stapel et al. |
| 2002/0103818 A1 | 8/2002 | Amberden |
| 2002/0104071 A1 | 8/2002 | Charisius et al. |
| 2002/0107913 A1 | 8/2002 | Rivera et al. |
| 2002/0111852 A1* | 8/2002 | Levine .......................... 705/14 |
| 2002/0112171 A1 | 8/2002 | Ginter et al. |
| 2002/0120685 A1 | 8/2002 | Srivastava et al. |
| 2002/0130902 A1* | 9/2002 | Shaouy et al. ............... 345/745 |
| 2002/0135617 A1 | 9/2002 | Samid |
| 2002/0143819 A1 | 10/2002 | Han et al. |
| 2002/0147645 A1 | 10/2002 | Alao et al. |
| 2002/0152267 A1 | 10/2002 | Lennon |
| 2002/0152279 A1 | 10/2002 | Sollenberger et al. |
| 2002/0161903 A1 | 10/2002 | Besaw |
| 2002/0169893 A1 | 11/2002 | Chen et al. |
| 2002/0173971 A1* | 11/2002 | Stirpe et al. .................... 705/1 |
| 2002/0178119 A1 | 11/2002 | Griffin et al. |
| 2002/0188869 A1 | 12/2002 | Patrick |
| 2002/0194267 A1 | 12/2002 | Flesner et al. |
| 2003/0014442 A1 | 1/2003 | Shiigi et al. |
| 2003/0032409 A1 | 2/2003 | Hutcheson et al. |
| 2003/0046576 A1 | 3/2003 | High et al. |
| 2003/0053615 A1 | 3/2003 | Anderson et al. |
| 2003/0088617 A1 | 5/2003 | Clark et al. |
| 2003/0110448 A1 | 6/2003 | Haut et al. |
| 2003/0120686 A1 | 6/2003 | Kim et al. |
| 2003/0126236 A1 | 7/2003 | Marl et al. |
| 2003/0126464 A1 | 7/2003 | McDaniel et al. |
| 2003/0126558 A1 | 7/2003 | Griffin |
| 2003/0131113 A1 | 7/2003 | Reeves et al. |
| 2003/0135490 A1 | 7/2003 | Barrett et al. |
| 2003/0140308 A1 | 7/2003 | Murthy et al. |
| 2003/0146937 A1 | 8/2003 | Lee |
| 2003/0167315 A1 | 9/2003 | Chowdhry et al. |
| 2003/0167455 A1 | 9/2003 | Iborra et al. |
| 2003/0200350 A1 | 10/2003 | Kumar et al. |
| 2003/0204481 A1 | 10/2003 | Lau |
| 2003/0212766 A1 | 11/2003 | Giles et al. |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229623 A1 | 12/2003 | Chang et al. |
| 2004/0024812 A1 | 2/2004 | Park et al. |
| 2004/0024888 A1* | 2/2004 | Davis et al. .................. 709/229 |
| 2004/0030744 A1 | 2/2004 | Rubin et al. |
| 2004/0030795 A1 | 2/2004 | Hesmer et al. |
| 2004/0078371 A1 | 4/2004 | Worrall et al. |
| 2004/0098467 A1 | 5/2004 | Dewey et al. |
| 2004/0167880 A1 | 8/2004 | Smith |
| 2004/0167899 A1 | 8/2004 | Patadia et al. |
| 2004/0205473 A1 | 10/2004 | Fisher et al. |
| 2004/0205557 A1 | 10/2004 | Bahrs et al. |
| 2004/0215650 A1 | 10/2004 | Shaji et al. |
| 2004/0230546 A1* | 11/2004 | Rogers ......................... 706/47 |
| 2004/0243824 A1 | 12/2004 | Jones |
| 2005/0021502 A1 | 1/2005 | Chen et al. |
| 2005/0050184 A1 | 3/2005 | Boden et al. |
| 2005/0060324 A1 | 3/2005 | Johnson et al. |
| 2005/0086206 A1 | 4/2005 | Balasubramanian et al. |
| 2005/0097008 A1* | 5/2005 | Ehring et al. .................. 705/26 |
| 2005/0198617 A1 | 9/2005 | Kim et al. |
| 2006/0009991 A1* | 1/2006 | Jeng et al. ....................... 705/1 |
| 2006/0059107 A1 | 3/2006 | Elmore et al. |
| 2006/0085412 A1 | 4/2006 | Johnson et al. |
| 2006/0122882 A1 | 6/2006 | Brown et al. |
| 2007/0083484 A1 | 4/2007 | McVeigh et al. |

FOREIGN PATENT DOCUMENTS

| | | |
|---|---|---|
| WO | WO 00/38078 | 6/2000 |
| WO | WO0114962 A1 | 6/2000 |
| WO | 0070481 | 11/2000 |
| WO | 0115042 | 3/2001 |
| WO | 0116851 | 3/2001 |
| WO | WO 01/15041 | 3/2001 |
| WO | WO 01/149662 | 3/2001 |
| WO | WO 01/67285 A | 9/2001 |
| WO | WO0038078 A1 | 7/2006 |

OTHER PUBLICATIONS

Moore, Bill, et al., "Migrating WebLogic Applications to WebSphere Advanced Edition", IBM Redbooks, Jan. 2001, pp. 1, 3-4, 109-111 and 181-195.*

Barrett, Alexandra, "Trying Out Transactions", SunExpert Magazine, Jan. 1999, pp. 57-59.*

Ayers, Danny, et al., Professional Java Server Programming, Wrox Press, Ltd., Birmingham, UK, Dec. 1999, pp. 515-545.*

Ford, Nigel, Web Developer.com Guide to Building Intelligent Web Sites with JavaScript, Wiley Computer Publishing, New York, NY, © 1998, pp. 65-86, 96-98, 101-102, 245-250 and 324-327.*

Microsoft Computer Dictionary, 4th Edition, Microsoft Press, Redmond, WA, © 1999, p. 489.*
VanderMeer, Debra, et al., "Enabling Scalable Online Personalization on the Web", EC '00, Oct. 17-20, 2000, ACM 1-58113-272-7/00/0010, pp. 185-196.*
Adomavicius, Gediminas, et al., "User Profiling in Personalization Applications Through Rule Discovery and Validation", KDD '99, San Diego, CA, © 1999, pp. 377-381.*
Cingil, Ibrahim, et al., "A broader Approach to Personalization", Communications of the ACM, vol. 43, No. 6, Aug. 2000, pp. 136-141.*
Stephanidis, Constantine, et al., "Decision Making in Intelligent User Interfaces", IUI '97, Orlando, FL, © 1997, pp. 195-202.*
Stiemerling, Oliver, et al., "How to Make Software Softer—Designing Tailorable Applications", DIS '97, Amsterdam, The Netherlands, © 1997, pp. 365-376.*
Rossi, Gustavo, et al., "Designing Personalized Web Applications", WWW 10, Hong Kong, May 1-5, 2001, pp. 275-284.*
Lee, Heeseok, et al., "A Scenario-Based Object Oriented Methodology for Developing Hypermedia Information Systems", Proc. 31st Annual Hawaii International Conference on System Sciences, © 1998, pp. 47-56.*
Rouvellou, Isabelle, et al., "Extending Business Objects with Business Rules", Tools 33, Jun. 5-8, 2000, pp. 238-249.*
Ferguson, Donald F., et al., "WebSphere as an e-Business Server", IBM Systems Journal, vol. 40, No. 1, © 2001, pp. 25-45.*
Kiyomitsu et al, Web Reconfiguration by Spatio-Temporal Page Personalization Rules Based on Access Histories, IEEE, Jan. 2001, pp. 75-82.
Beca, Applications of XML and Customizable Components in Building Virtual Places on the Web, IEEE, Jun. 2000, pp. 242-247.
Anupam et al., Personalizing the Web Using Site Descriptions, IEEE, Sep. 1999, pp. 732-738.
Kim, et al., A Personalized Web Search Engine Using Fuzzy Concept Network with Link Structure, IEEE, Jul. 2001, pp. 81-86.
Benjamin N. Grosof; Yannis Labrou; Hoi Y. Chan; A Declarative Approach to Business Rules in Contracts: Courteous Logic Programs in XML, (1999) ACM 1-58113 176-3/99/0011.
Angela Bonifati; Stafano Ceri; Stefano Paraboschi; Pushing Reactive Services to XML Repositories using Active Rules, ACM Proceeding, ACM Computing Surveys, vol. 32, No. 4, Dec. 2000, pp. 633-641.
Donald Kossmann; The State of the Art in Distributed Query Processing, ACM Computing Surveys, vol. 32, No. 4, Dec. 2000, pp. 422-469.
Benjamin N. Grosof and Yannis Labrou; An Approach to using XML and A Rule-based content Language with an Agent Communication Language (IBM Research Report); May 28, 1999,, pp. 1-21.
"USData Center Chooses Baltimore SelectAccess to Enable Next generation Security Solutions for eBusiness"; Business Wire, P2079, Apr. 4, 2001; Newswire; Trade; pp. 2.
Eiji Okamoto, Proposal for Integrated Security Systems, Jun. 1992, IEEE Computer Society Press, p. 354-358.
http://java.sun.com/products/ejb/(last visit; Dec. 7, 2004).
http://www.javaworld.com/javaworld/jw-12-2002/jw-1207-yesnoejb_p.html (last visti: Dec. 7, 2004.
Zhang, et al., "Designing a Robust Namespace for Distributed File Services", Reliable Distributed Systems, 2001, Proceedings 20th IEEE Symposium on Oct. 28-31, 2001, pp. 162-171.
Adya, et al., "FARSITE: Federated, Available and Reliable Storage for an Incompletely Trusted Environment", ACM SIGOPS Operating Systems Review, vol. 36, Issue SI (Winter 2002), OSD1 '02: Proceedings of the 5th . Symposium on Operating Systems Design and Implementation, pp. 1-14.
Freudenthal, et al., "dRBAC: Distributed Role-Based Access Control for Dynamic Coalition Environments", Proceedings of the 22nd International Conference on Distributed Computing Systems (ICDCS '02), IEEE 2002, 10 pages.
Kistler, et al., "WebL—a programming language for the web" Computer Networks and ISDN Systems, North Holland Publishing, Amsterdam, NL, vol. 30, No. 1-7, Apr. 1998, pp. 259-270.

Levy, "Web Programming in Guide", Software Practice & Experience, Wiley & Sons, Bogner Regis, GB, vol. 28, No. 15, Dec. 25, 1998 pp. 1581-1603.
Atkins, et al., "Mawl: A Domain-Specific Language for Form-Based Services" IEEE Transactions on Software Engineering, IEEE Service Center, Los Alamitos, CA, US, vol. 25, No. 3, May 1999. pp. 334-346.
Howes, "The String Representation of LDAP Search Filters", © The Internet Society, Dec. 1997 (RFC 2254) pp. 1-8.
Catley, et al., "Design of a Health Care Architecture for Medical Data Interoperability and Application Integration", Proceedings of the Second Joint EMBS/BMES Conference, Houston, TX, US, Oct. 23-26, 2002, IEEE, vol. 3, pp. 1952-1953.
Browne, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.
European Search Report dated Dec. 19, 2006, Application No.: EP 01975484.5, 3 pages.
Candan, et al., "Enabling Dynamic Content Caching for Database-Driven Web Sites", Proceedings of the 2001 ACM SIGMOD International Conference on Management of Data, Santa Barbara, CA, US, May 21-24, 2001, pp. 532-543.
C.W. Symborski, "Updating Software and Configuration Data in a Distributed Communications Network"; Computer Networking Symposium, 1988, pp. 331-338.
European Search Report, dated Oct. 12, 2006 (3 pages).
Lee, Amy, et al., "Keeping Virtual Information Resources Up and Running", IBM Centre for Advanced Studies Conference, Proceedings of the 1997 Conference of the Centre for Advanced Studies on Collaborative Research, IBM Canada, IBM Press, Nov. 1997, pp. 1-14.
Tanyi, Emmanuel, Easy XML, Mar. 6, 2000, www.winsite.com, pp. 1-6.
IBM TDB, "Method and System for Visually Constructing Document Type Definitions and Related Artifacts Using a Reusable Object Model", IBM Technical Disclosure Bulletin, IP.com, Inc., May 23, 2001, 3 pages.
Parker, Elisabeth, "The Complete Idiot's Guide to Microsoft FrontPage 2000", 1999, QUE, pp. 7 and 52.
USData Center . . . eBusiness, Business Wire, p. 2079, Apr. 4, 2001, pp. 1-2.
Hayton, et al., "Access Control in an Open Distributed Environment", 1998, 12 pages.
Bertino, et al., "TRBAC: A Temporal Roe-Based Access Control Model", ACM Transaction on Information and System Security, vol. 4, No. 3, Aug. 2001, pp. 191-223.
Sandhu, et al., "Role-Based Access Control Model", IEEE Computer, vol. 29, No. 2, Feb. 1996, 22 pages.
Covington, et al., "Securing Context-Aware Applications Using Environment Roles", ACM Workshop on Role Based Access Control, Proceedings of the Sixth ACM Symposium on Access Control Model and Technologies, 2001, 11 pages.
Yao, et al., "A Model of OASIS Role-Based Access Control and its Support for Active Security", ACM Workshop on Role-Based Access Control, Proceedings of the Sixth ACM Symposium on Access Control Models and Technologies, 2001, 11 pages.
Georgiadis, et al., "Flexible Team-Based Access Control Using Contexts", ACM Workshop on Role-Based Access Control, Proceedings of the Sixth ACM Symposium on Access Control Models and Technologies, 2001, 7 pages.
Tzelepi, "A Flexible Content and Context-Based Access Control Model for Multimedia Medical Image Database Systems", Proceedings on the 2001 Workshop on Multimedia and Security: New Challenges, Oct. 5, 2001, 4 pages.
Goh, et al., "Towards a More Complete Model of Role", Symposium on Access Control Models and Technologies, Proceedings of the Third ACM Workshop on Role-Based Access Control, 1998, 7 pages.

* cited by examiner

_US 7,499,948 B2_

SYSTEM AND METHOD FOR WEB-BASED PERSONALIZATION AND ECOMMERCE MANAGEMENT

CLAIM OF PRIORITY

This application claims priority from provisional application "SYSTEM AND METHOD FOR RULES-BASED WEB SCENARIOS AND CAMPAIGNS", application Ser. No. 60/283,977, filed Apr. 16, 2001, and provisional application "SYSTEM AND METHOD FOR WEB-BASED PERSONALIZATION AND ECOMMERCE MANAGEMENT" application Ser. No. 60/306,509, filed Jul. 18, 2001, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to online and particularly to web-enabled systems, and to methods for personalizing an application behavior and content for a user or group of users.

BACKGROUND OF THE INVENTION

In the field of e-commerce, there exists a demand for businesses to be able to tailor their products and services to better match the needs and requirements of their customers. This demand exists equally in both the business-to-business (B2B) and the business-to-consumer (B2C) worlds. A particular example of such tailoring of business services is in the field of personalization. Personalization allows a business to personalize, or otherwise customize, their offerings to a particular customer, or group of customers. For example, in an Internet/Web environment, a B2C content provider may wish to deploy a Web site in which the Web site content is personalized for each individual customer visiting the site, or for each type of customer based on certain characteristics. Examples of such Web-based B2C providers include on-line catalog-providers; product vendors; news, media and entertainment providers; and information or reference sources.

As their business success has come to depend more and more on dependable personalized services, e-commerce providers have demanded more from their personalization systems. A prevalent demand is for personalization systems that can assist a provider in not only providing a personalized Web site, but can allow the e-commerce provider to tailor all of their business functions—marketing, production, distribution, etc. at a single source, and to update the information or data that these functions rely on, in a quick, dependable, and easily-modifiable manner, that requires little or no system down-time.

Traditional systems used for personalizing web content are mostly analytic in nature, and rely on using previously collected data in a manner that allows an administrator to modify a web site or e-commerce application based on an understanding of that data. For example, personalization systems from vendors such as ATG and Broadbase, who primarily provide Online Analytical Processing (OLAP) systems, rely on the commerce provider collecting sufficient by large amounts of data to represent their target population in an analytical way, i.e. statistically, and to then use that data to personalize content to a sub section of the population. Data can be collected by traditional mechanisms, i.e. through standard market research tools, or can be collected on-line through for example, maintaining histories of a customer's prior use. However, such data is typically stored in a repository for further analysis before it is subsequently analyzed and used to allow an administrator to update the actual content. In this manner the data is not used to provide a real-time personalization of the system, or one that is easily modifiable in run-time by an administrator. Instead, the data is used more to present a change in content over a large period of time and a large number of users. No attempt is made to customize data content at the per-user level during the actual user or customer session.

As today's e-commerce demands grow to requiring real-time update of personalized user content, and/or available products and services, there is an ever increasing demand for systems that allow an administrator to quickly customize the content that is presented to a user during application run-time, and even when the user is actively operating within a session. Furthermore, systems that allow this change to be effected automatically, i.e. by using rules or some other mechanism to alter the content presented to a user during their session, are especially useful. As end users become more sophisticated, and demand better quality of service from their content providers, and as back-end commerce applications become more complex, and flexible enough to offer such a detailed variation in content, there is an ever increasing demand for systems that allow or support the ability to provide real-time personalized data content to the user. Systems that can do this, while at the same time allowing great ease of use in setting up data content and marketing campaigns, are especially useful, since they allow an administrator to quickly administer the actual content and the rules by which that content will be sent to the user.

SUMMARY OF THE INVENTION

The invention provides a system and a method for allowing an e-commerce provider to customize or to personalize their business functions or content for each customer, group of customers or for a particular type of customer. A simple example of this is in the personalization of a Web site, such that each visiting customer may see perhaps slightly different site content, customized for their particular needs. But the system may be equally used in any business system that would benefit from personalization. As used herein, a user or customer may be an individual or any other entity, such as another organization or company. The business functions the user accesses may not be the type displayed on a screen, but may instead be, for example, automatic style order retrieval and processing and other operations. The invention allows application behavior and data to be personalized at any step in the process, and between any entities.

Generally described, the invention provides a personalization system that uses rules to adjudicate and characterize a customer, or a customer's actions, and then to personalize a business function, such as for example a data communication, or a displayed page, based on the outcome of those rules. Rules may be used to create scenarios—potential series of events that characterize a customer's session. Scenarios may in turn form the basis of campaigns—a set of possible scenarios that have a combined start time and a stop time, within which the customer operates, and within which environment the rules-based system makes its determinations, and provides characterizations and personalizations.

In the environment of the Internet and/or a website, an embodiment of the invention can be used to display personalized content to a Web user based on their session information. In this embodiments, the Web application used by the user may be, for example, a commerce Web site application such as a on-line booking system, e.g. flight reservations, or product catalog ordering. When the user logs into such an application a session is created and events occur that correspond to that session. These events are used to drive the rules-based engine, which in turn in used to drive the providing of content. Inferences about the user's profile can be made based on the user profile, and rules can be then run against that profile, all of which occur in real-time, and without need the to refer to a secondary personalization source such as a repository of statistical or marketing information.

In accordance with one embodiment of the invention, a Personalization Rules Editor allows business users to manage customer relationships and fine-tune user-system interactions using a task-driven interface and easy-to-use rule editing templates. The Personalization Rules Editor drives an embedded rules engine, and eliminates the need to master complex Boolean logic to create and edit rules, allowing business people to focus on creating business rules that manage customer interactions.

Behavior Tracking records page impressions, click-throughs, "add-tos" and removals from shopping carts, and purchase and order histories, for use in analysis of customer shopping and buying patterns.

Placeholders and Promotions are an easy way for business users to specify where promotional content will appear. Once Java Server Page (JSP) page tags are in place on the pages, placeholders eliminate the need to reprogram the application every time content on the pages needs changing. Users simply point and click to choose and place content on pages using the administration tool.

An Email Service provides the ability to send personalized emails triggered by user events.

Discounts and Pricing can be applied in a variety of ways including percentage off, fixed amount off, and fixed price. Discounts may be applied to product items, whole orders, or shipping. Cross-sell and up-sell scenarios can be combined with discounts to create strong incentives.

The web-based Personalization Server enables management of customer relationships to win and retain customers. A business must quickly attract and retain customers to achieve competitive advantage and market leadership. The Personalization Server provided by the invention enables adaptable e-commerce applications that personalize customer interactions and drive online sales. Information can be captured about customers and shared with the business processes inside and outside the enterprise, and used it to enhance customer experience. Capturing this information, and using it to personalize future interactions, ensures that the e-business delivers highly relevant information to customers.

The Personalization Server includes complete personalization capabilities, and a rich set of pre-built templates and commerce functions, to quickly assemble adaptable solutions that respond to the needs and interests of customers and targeted customer segments. The portal framework included in Personalization Server allows developers to quickly build portal sites using a my Portal-style interface. This new framework enables users to personalize the content, layout, and overall appearance of the portal according to their own preferences, as well as manage their profiles. Also included are essential tools for integrating with leading e-analytics e-marketing systems, and creating and managing personalized content utilizing either out-of-the-box solutions or integrated content management packages. The customer experience can be personalized based on responses to outbound marketing campaigns, and response information analyzed to further segment customers for deeper personalization.

Using a task-driven, user-friendly GUI tool, the powerful personalization capabilities of Personalization Server can be directly accessed by business managers.

Benefits provided by the invention include:
   The ability to personalize and deepen customer relationships with enhanced e-business content management and personalized business scenarios.
   Time-to-market and competitive advantage with a suite of e-commerce components and templates that can be quickly customized.
   Reduction in cost and complexity of creating, deploying, and managing multiple enterprise portals with a portal framework.
   Improvements in efficiency and productivity of employees, customers, and partners with easy-to-find information and services.
   The ability to deploy with confidence using a industry-leading platform that helps you get to market faster, build and retain preferred customer relationships, and achieve business agility in today's Internet Economy.
   Overall Investment protection with the open and extensible architecture based on Java 2 Enterprise Edition (J2EE) and Enterprise JavaBeans (EJBs).

The invention thus provides a system for web-based personalization, that allows for personalizing the content or business functioning of a web-based application to reflect the characteristics of a particular user of said web-based application, said system comprising: a user profiler, for determining a snapshot of a particular user of a web-based application; a rules editor for inputting a set of rules governing the business functioning of said web-based application; a rules engine, that accepts input from said rules editor and said snapshot of said particular user, and uses said set of rules to make decisions about said particular user and the business functioning of said web-based application; and, a personalization process or that uses the output of said rules engine to determine the content or business functioning of said web-based application as it applies to said particular user.

DETAILED DESCRIPTION

Figure 1:
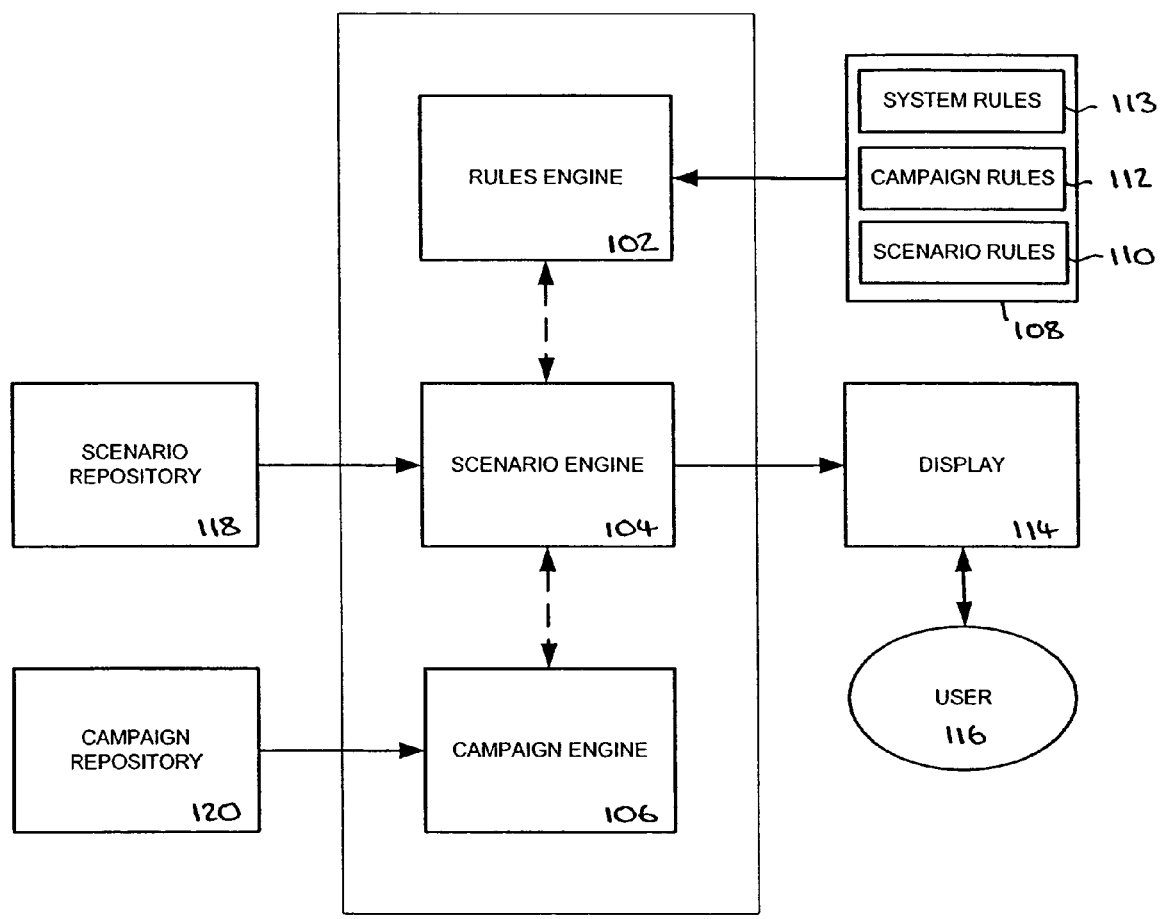
FIG. 1 shows a schematic of a rules-based personalization system in accordance with an embodiment of the invention.

The following glossary and definitions of Terms, Acronyms, and Abbreviations will be useful in describing the invention:

| | |
|---|---|
| B2B | Business to Business |
| B2C | Business to Consumer |
| CMS | Content Management Service |
| DASL | DAV Searching and Locating (IETF draft) |
| DMS | Document Management System |
| DTD | Document Type Definition (with XML) |
| EJB | Enterprise JavaBeans. A server component architecture for writing Java Server components. |
| FIFO | First In, First Out |
| I18N | Internationalization |
| J2EE | Java 2 Enterprise Edition |
| JSP | JavaServer Pages-A J2EE component for generating dynamic web page content. |
| JNDI | Java Naming and Directory Interface. A protocol standard for looking up objects and resources. |
| OOTB | Out Of The Box |
| RDBMS | Relational Database Management System |
| SPI | Service Provider Interface |
| TagLib | A JSP tag library that contains JSP tag definitions. |
| WLS | WebLogic Server |
| UUP | Unified User Profile |
| XML | Extensible Markup Language |

The invention provides a real-time rules-based personalization engine that can be used to personalize and customize business functions, application, or information content for delivery to a customer or a user of the system. In the context of this invention, the customer or user may be an individual, for example an individual user of a web site, or they may be another organization that uses interactive or automatic mechanisms to communicate with the system. As the user interacts with the system, events are generated which are used to drive the rules-based engine. In accordance with the particular rules used, the personalization engine determines in real-time, which content or information should be transmitted to the user. For example, this content may be the particular information a user sees on a web site display, or it can be some other form of data communication, for example, data automatically communicated to a Wireless Application Protocol (WAP) device or a Personal Digital Assistant (PDA) device that is not necessarily seen by the user. In accordance with one embodiment of the invention, XML files are used to configure the working of the rules-based engine, allowing the administrator to quickly and easily modify the operation of the rules-based engine by simply editing the text of the XML files. Since the rules-based engine can be used to control business functions other than the mere display of data on the screen, the invention provides organizations with an ability to personalize their business functions and applications for each customer, or type of customer.

The operation of the personalization system is made easier by the use of campaigns and scenarios. As used in the context of this invention, a scenario is a set of events that will cause a particular rule to be triggered and the corresponding action, business function, or data to be displayed. A campaign may include many scenarios, and provides an easy mechanism by which an administrator can control an entire set of scenarios to best reflect the needs of a particular user of group of users.

FIG. 1 shows a schematic overview of a personalization system, as it may be used with one embodiment of the invention to provide personalized content to a user, for example, in a Web environment. As shown in FIG. 1, a rules engine 102 interprets rules 108 defining system rules 113, scenarios 110, and campaigns 112, to select a particular set of scenario and campaign settings, for use in displaying content to a user. The scenarios 118 and campaigns 120 can be stored for later activation when needed. Rules are used to define the operation of the rules engine 102 (and optionally separate scenario engine 104 and campaign engine 106, although it will be evident that the function these two latter engines can be performed solely by rules engine 102) and particularly to tell the rules engine which scenario and which campaign of a set of variable scenarios and campaigns should be used in selecting and generating the content for display 114 to the user 116.

Rules-based Engine

The centerpiece of the invention is a rules-based engine. The rules-based engine utilizes rules to make informed decisions about the current proceedings and to determine actions therefrom. Each rule defines a situation (an "if" clause) and an action (a "then" clause). The use of such rules allows a flow-chart style chaining of situations and actions into a scenario. The rules are stored within a ruleset, or within a plurality of rulesets. As used herein, a ruleset is a collection of related rules, bundled so that the rules engine can use them together. Rulesets, and rules, are used to direct the flow of events within scenarios and campaigns.

In accordance with one embodiment of the invention, rules may be written in an XML format for ease of portability between systems. Additionally, the XML schemas may be parsed in real-time, allowing for the real-time modification of the rules (and of the business workflows) without requiring any system down-time. Furthermore, since a user's characteristics or profile can be calculated by a series of rules, the system provides a mechanism by which a real-time "snapshot" of a user can be generated on demand, and can be used to provide personalized content or services for that user.

Scenarios

A scenario is a chain of conditions and actions. The scenario describes a flowchart of possible interactions with a user. A campaign uses a set of such scenarios to achieve a business goal for a sponsor or to address a particular business function. In the context of a Web-site or a similar B2C application, campaigns may use on-line ads, email, and consumer discount promotions, through the scenarios, to achieve these goals.

Scenarios represent abstract functionality. However, scenarios used within the context of a campaign may be built on top of any business-to-business, business-to-consumer, or e-commerce platform, such as the range of WebLogic application server commerce server products from BEA Systems.

In accordance with one embodiment scenarios are individually named and maintain a list of classifications for which each scenario is valid. Through a scenario engine, a particular scenario can be searched for based upon such criteria as Name, Description, or types of Classifications. The search may include both whole-word matching and pattern-matching (e.g. description like '*superbowl*'). The results of the search is the names of those scenarios that match the search. During real-time delivery of context the system can quickly match the current situation to a shared scenario and react accordingly.

The scenario engine acts as a scenario definition repository. The scenario definitions may be stored in XML format for ease of use in editing, although other formats can be used. The scenario engine may also return XML definitions of scenarios, by name and can deploy scenarios given a scenario definition.

Scenarios are comprised of a ruleset with constituent rules. Each rule defines a situation (an "if" clause) and an action (a "then" clause). The use of the rules allows the flowchart style chaining of situations and actions into a scenario.

Possible inputs ("if's") into the scenario ruleset include, but are not limited to:

The user's individual properties;
The results of executing a net of Classification rules;
The user's current session and request information (this may include for example their ShoppingCart, or their page location);
An Event that takes place during the session;
The current Time; or,
A random number (to allow the system to undertake probability-based calculations).

Using a scenario rules editor, a system user (typically a systems administrator for example) is able to write custom rules against any inputs, including for example, against the user profile, against the contents of the user's session (specifically the shopping cart), against the user's current request information (browser type, page location, etc.), against certain user historical events (e.g. shopping history), against the event type, headers, or body (the text body in a TextMessage, etc.) The possible outputs ("items") from the ruleset includes an Action definition, (ActionDef) to execute, i.e. one or more actions which the system must take to respond to the input. This may include delivering a particular type of content.

Scenarios are valid only for certain user classifications (i.e. customer segments).

The rules engine does not execute any functionality itself (i.e. it does not generate Actions, such as posting Events, etc). Instead, identifying objects are passed out from the rules engine to the scenario engine, which then performs the required action according to its scenario repository.

In normal use the evaluation of a rule will assert an ActionDef. The action will cause something to happen, or to be displayed to the user. The user will do something that will cause an event. The event will be sent to the scenario engine and the cycle will repeat until, possibly, an end state is reached.

Campaigns

A campaign is a sponsored set of scenarios designed to achieve a particular goal. In a marketing context the campaign may be designed to promote a certain range of goods for a certain period of time. Other campaigns are more general in that they merely include a set of (typically related) scenarios which the company or organization currently wants in effect. Each campaign is associated with one or more scenarios. Campaigns can be marked as either active or inactive, and typically have a designated date/time at which they start and stop. Through the campaign engine, campaigns can be searched for based upon such criteria as, Name, Start and/or stop time, Classifications (via relationships to scenarios), Sponsor name, Description, Value proposition, Goal description and Active state.

The search may include both whole word matching and pattern matching (e.g. description like '*superbowl*'). The results of the search is the names of those campaigns that match the search. The scenarios related to the campaign can then be retrieved via searching on the scenario engine.

The campaign engine acts as a campaign definition repository. As with the scenario definitions, the campaign definitions may be stored in XML format. The campaign engine can return XML definitions of campaigns, by name, and can deploy campaigns given a campaign definition.

Figure 2:
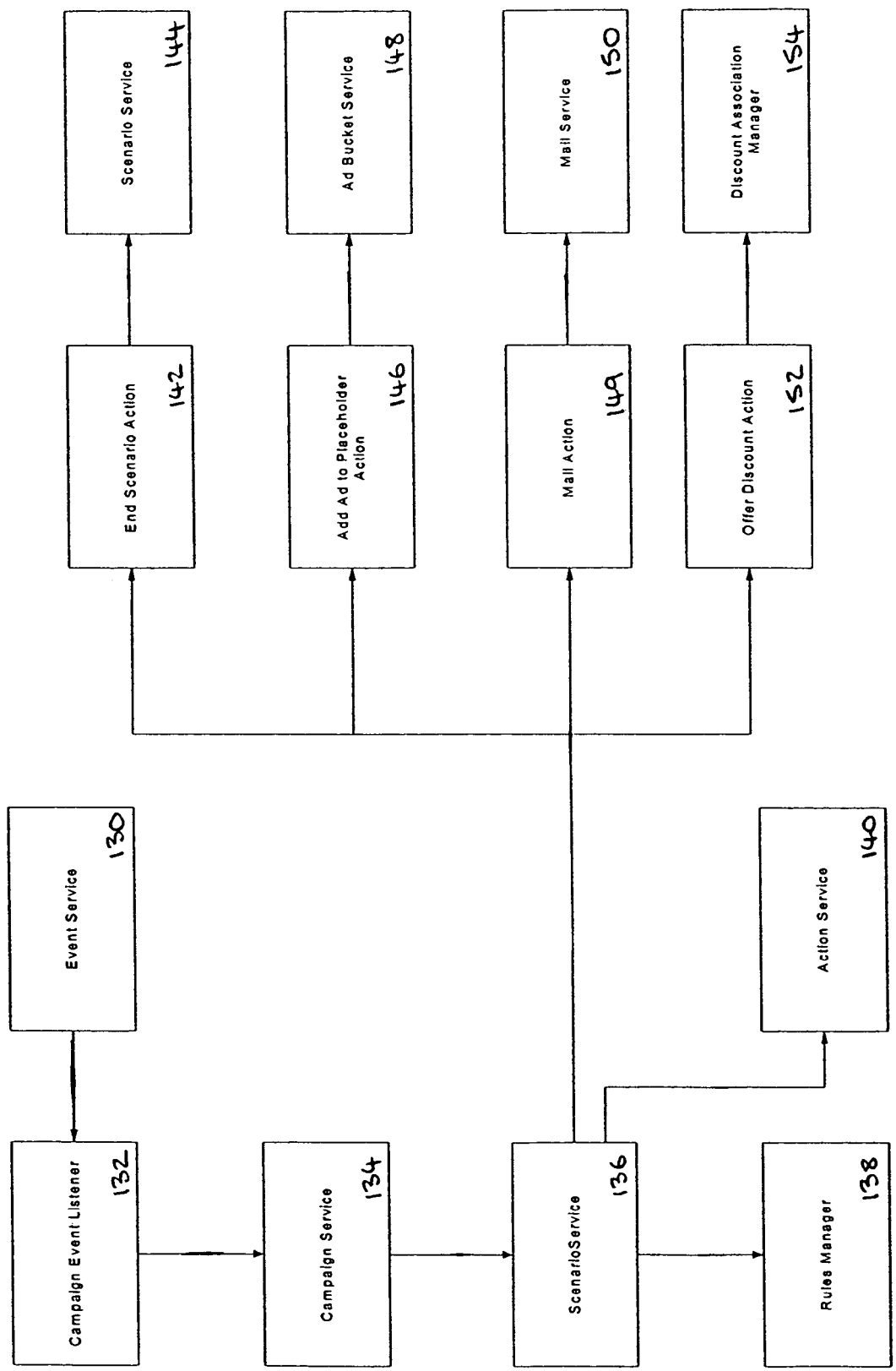
FIG. 2 shows an illustration of the operation of a rules-based personalization system in accordance with an embodiment of the invention.

FIG. 2 illustrates how campaign scenarios and rules are used together to provide a personalization system in accordance with an embodiment of the invention. As shown in FIG. 2, an events service 130 is used to receive a particular event and to pass notification of this event to a campaign event listener 132. Events are the driving force that are used to trigger real-time changes within the rules engine that in turn determine the output given to the user. For example, an event may be a user login event, or in the case of a web application a request from the user to select a particular page or to submit a certain type of form. Events need not necessarily trigger rules to take effect, since some events can be purposefully ignored by the events service. The campaign event listener 132 can also be used to filter out certain event types, passing the event to the campaign service 134 for further processing. The campaign service 134 loads the currently active campaigns, i.e. those campaigns specified by an administrator or being currently in place. If the event it receives is from a particular campaign then the campaign service loads that campaign. It then uses this campaign information to build a map of campaign scenario ids and to pass this information along to the scenario service 136. The scenario service 136 acts as a subset of the campaign service 134, and is used to filter out scenarios for which the user has reached an end state. If the user has reached an end state, then this implies there is no further work to be done on the part of the system and it is up to the user to determine the next step. However, when the user has not reached an end state the scenario service loops to determine if the event type is valid for the particular set of scenario rules in effect. If it is not valid then the scenario may be ignored. If additional customer segments are needed the scenario service can also be used to execute a segments ruleset. The scenario service may also be used to execute the scenario ruleset and get a list of action definitions. In order to perform this processing the scenario service 136 uses rules from the rules manager 138 to determine the rules in effect for that particular scenario. Each rule typically specifies at least one or more action definition. For each action definition from each scenario, the scenario service gets the action object from the action service 140. As it runs each action object, and depending on the actual implementation different events may occur. For example, as shown in FIG. 2 these events may also compel such actions as the end scenario action 142, which uses the scenario service 144 to set an end state on the user for that campaign scenario; the ad placeholder action 146, which uses the ad bucket service 148 to put an ad query in the user's bucket; the mail action 148, which uses the mail service 150 to batch an email to the user for later sending; and the offer discount action 152 which uses the discount association manager 154 to give the user a discount on their session. While the examples shown in FIG. 2 illustrate a variety of features and services that can be provided by the invention, it will be evident to one skilled in the art that the event examples shown are not intended to be exhaustive, but are merely illustrative of the types of events, scenarios and services that can be used with the invention. It will be evident that other types of rules, events and appropriate services can be added to best suit the needs of the particular organization or e-commerce application.

Figure 3:
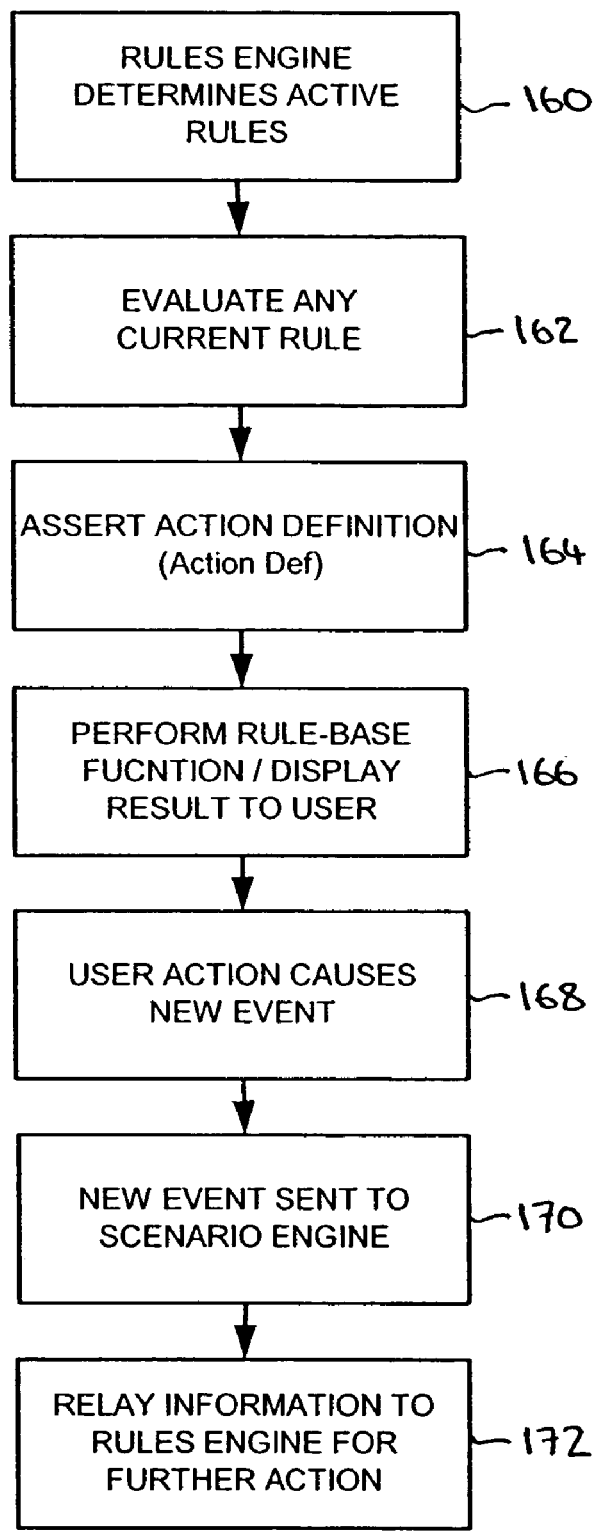
FIG. 3 shows a flowchart of a scenario rules and action process in accordance with an embodiment of the invention.

FIG. 3 illustrates a flow chart of a typical process that may be used by one embodiment of the invention to provide real-time personalized content for a user or a customer of the system. As shown in FIG. 3, in step 160, once invoked the rules engine determines a particular set of rules for use in this situation. In step 162 the rule is evaluated using an "if then" clause, in which the system reads the current state of a user's session i.e. the "if" portion, and determines from the set of potential scenarios what the output should be. In step 164 this output is asserted as an action definition, which determines how the system should respond to this particular user in this particular context, i.e. what action it should take. In step 168 the output, if any, is displayed as a result to the user. As will be evident, the system could decide to do some other action that does not effect the display but communicates data or alters some business function or application in some other manner. At step 166, at any later point in time, if the user through their actions causes an additional event to occur then, in step 170, this event is sent to the scenario engine (or rules engine id a single engine is used). In step 172 the scenario engine relays information back to the rules engine, for use in subsequent rule determinations, that will determine how this system should respond to the subsequent event.

Campaign Goals & Activation

Campaigns can use goals in two ways. A goal is a textual description that can be used to better clarify the purpose of the campaign. Secondly, a goal is a quantitative measurement that can be achieved by a campaign. In accordance with one embodiment, all campaigns have an is-active rule, which receives the following inputs:
   The campaign data object;
   Access to ad exposure and click counts;
   The event; and,
   The current date and time.

The output of the is-active rule is either a True or False. True indicates that the campaign is currently active. False indicates it is not active and that no additional processing will take place. There is a mechanism to deactivate a campaign, regardless of the campaign activation criteria the campaign can always be activated or deactivated by an administrator. This status is first checked before evaluating the activation or scenario rules. Additionally, campaigns can have start and stop times that determine a campaign's active state.

Campaign Lifecycle

Figure 4:
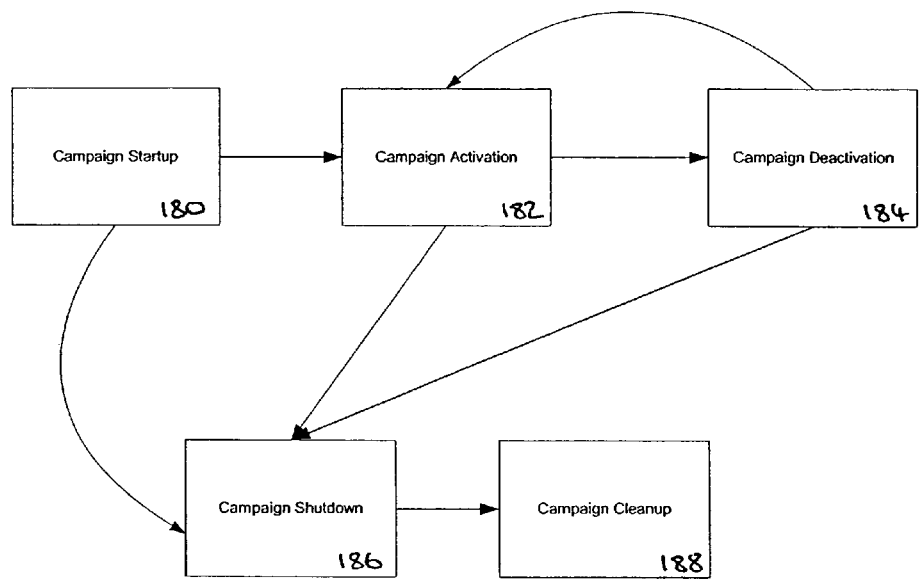
FIG. 4 shows a schematic of a campaign lifecycle in accordance with an embodiment of the invention.

FIG. 4 illustrates the process by which a campaign is added or removed from the runtime environment. The Campaign must first be started 180. This typically occurs when it is first deployed, although the startup could be delayed until a manual process occurs. Some embodiments of the invention may allow per-scenario startup rules to be specified. At startup, these per-scenario startup rules of the campaign are fired. The inputs are the campaign data object and the current time. The outputs are the action definitions (ActionDefs) to execute.

After the campaign has actually been started, it subsequently becomes active 182, generally based upon the start time of the campaign, or by explicitly marking it as an active campaign. Anytime after first becoming active, the campaign can become or be marked as inactive 184, either by reaching the campaign's predetermined stop time, the campaign's goals being met (i.e. an "is-active if" rule), or by an administrator deactivating the campaign. After being deactivated, the campaign can in some instances become active again, generally by the administrator modifying it, redeploying it and marking it active.

In some embodiments, at any point after starting up, the campaign can also be shutdown 186. This is generally a manual process performed by an administrator. During shutdown, all of the per-scenario shutdown rules are executed. The inputs to these rules is the campaign data object and the current time. The outputs should be the action definitions (ActionDefs) for the campaign engine to execute. These actions should typically undo any of the actions from the startup rules, although there is no mandatory requirement to do so.

After the campaign has been shutdown, it is cleaned up 188. This involves removing all campaign related data (e.g. ad exposure counts, scenario state information, etc.). It may also involve removing the campaign definition from the campaign engine repository.

Reporting/Analytics

Campaigns are driven by events. Additionally, ad exposure and click-through counts are maintained by the campaign service for campaign usage. These can also be accessed for reporting.

ActionService

The action service abstracts the notion of an action which the scenario engine is supposed to execute, based upon the results of a ruleset. This allows the rules to assert a generalized definition of a concrete action. This ActionDef can be used to gain access to an object which can then execute the underlying action. New Actions can thus be created and deployed without restarting the server. One way to do this is to deploy a Session EJB which can serve up the concrete Action objects.

An Action repository is available to the scenario tool. In one embodiment this action repository can be described by an XML document. The scenario tool uses this to dynamically display the action to the user, and to gather all of the parameters to the action from the user. A predefined set of Actions for campaigns may include the following:
   Place an ad group (query) in a user or global placeholder with a weight.
   Remove an ad group (query) from a user or global placeholder.
   Offer the user a named discount.
   Generate an email for the user from a URI with a Subject.

Placeholders

A placeholder represents a position within a Java Servlet Page (JSP). The behavior of the placeholder is determined by the particular system configuration. This is very similar to the scenario's Action concept. However, the behavior of the placeholder is very much request-driven, not event-driven. In typical implementations, a request will come in at a web page from a web user for a JSP page that contains a placeholder JSP tag. The tag contacts a session EJB that will return an object describing the behavior that should occur. The behavior can optionally be a displayable unit. In the case of a displayable unit, the displayable unit will include a renderer object which knows how to display the unit.

Ad Placeholders

In those environments that use the invention for ad generation, placeholders can be used to display ads. For placeholder behaviors that display ads, an ad bucket for a user for a placeholder is used. The ad bucket contains a set of ads or ad groups that should be displayed to the user, plus a bucket-entry based view count. Each entry in the bucket has the following information: User name; Placeholder name; Date and time entered; Ad query (defined the ad or ad group to display); Weight; View count; Campaign name; Scenario name.

In some implementations there can be an ad bucket for each placeholder that is not tied to a particular user (i.e. a global-user bucket). Otherwise, each entry in the bucket will have the same information.

Because an ad bucket might be populated externally from the placeholder request (i.e. by the campaign/scenario engines), an ad bucket conflict resolution mechanism can be used. This conflict resolution mechanism determines which entry in the user's ad bucket will actually be used to find an ad to display. In one embodiment, the weight of the valid bucket entries is used. A bucket entry is valid if its corresponding campaign is currently active or it is not associated with a campaign. A single entry's weight will give it a (weight*100/ (sum of all weights)) percent chance of being viewed. A random number is used to determine which bucket entry will be used. For example, if there are four entries in the bucket with weight 1,2,3, and 4, then the layout might be for example:

| Entry | Weight | Formula | % chance used |
|---|---|---|---|
| Ads1 | 1 | (1 * 100)/(1 + 2 + 3 + 4) | 10% |
| Ads2 | 2 | (2 * 100)/(1 + 2 + 3 + 4) | 20% |
| Ads3 | 3 | (3 * 100)/(1 + 2 + 3 + 4) | 30% |
| Ads4 | 4 | (4 * 100)/(1 + 2 + 3 + 4) | 40% |

Once the entry has been determined, the entry's query is executed to result in a set of ads (i.e. an ad group). Each ad in the group will have its own weight. A similar algorithm will be applied to determine which ad from the ad group to use. If something occurs to cause the ad group size to be zero, the system will choose a new bucket entry to use, ignoring the previously selected bucket entry. If there are no user bucket entries, a global-user bucket will be checked in the same fashion. The global-user bucket will generally be populated via campaign startup rules.

In one embodiment of the invention for use with Web-sites having advertisements, the display a particular ad to the user can generate an event, as will the click-thru of an ad. In both cases, the ids of the campaign and scenario that placed the ad into the ad bucket are passed along with the event. This enables the system to tie "See" and "Click-thru" events back to both the ad and the campaign, for subsequent analytical and reporting purposes.

Ad Service

The ad service provides ad metadata and content for subsequent display to the user. The service is able to retrieve an ad based upon its unique identifier or based upon a search against ad metadata. Ads may include for example: a single image with an optional click-thru URL, alternate text, border specification, width, height, and mouse overtext; a block of HTML text (which can contain a click-thru URL), plus any of the supplementary media referenced by the HTML block; or a reference to in-line a JSP page.

All ads have an associated relative weight, which can be an integer number. The weight of a particular ad is used to resolve ad display conflicts.

In one embodiment, the ad service keeps track of the following ad impression (what a user sees), and click-thru event counts per ad: Global count; and, Per-campaign count.

This information is used to handle the campaign goal evaluation. It could additionally be used in reports. Per-user ad counts can be handled through the event service.

In some embodiments, there can be a mechanism to query the ad service to view, increment, and decrement the counts. This information is then used immediately by the campaign and scenario engines and so must be retrievable at the above levels of detail.

Email Service

An email service can be used to support email based campaigns. Email based campaigns allow the system to direct personalized email content to a user or group of users. In one embodiment the email service supports two modes of operation based upon configuration: batch mode or pass-thru mode. Pass-thru mode causes the service to immediately send the email request. Batch mode causes the service to store the email request to a datastore from where it can be sent at a later time. An administration interface or a command-line program can be used to fire off batched emails. The information required by the email service is: the standard email header information (e.g. To, From, Subject), the MIME email header information (e.g. Content-Type, Content-Length, Content-Disposition, some of this might be determined from the email body), the body of the email, the ids of the campaign and scenario which initiated the email, and how long the email is valid (i.e. if it hasn't been sent in 5 days, don't bother)

Deployment of Campaigns and Scenarios

Campaigns and scenarios must be deployed to the server before they may operate. In one embodiment a servlet capable of passing XML definitions to the appropriate service for deployment can be used.

The Campaign and Scenario Services take their input from XML files that may in turn be generated by a set of administrator tools. Schemas for Campaign and Scenario definitions are used, as well as a schema for Scenario Rules.

An administrator can use these administration tools to create and deploy Campaign and Scenario definitions. The tools generate XML files that represent these definitions, and deploy the new definitions through a deployer servlet. This servlet accepts a stream of XML data and calls the appropriate services to handle the data. Campaigns, Scenarios, and their associated Rules may be deployed separately. Normally the rules will be deployed first, followed by the scenarios that use them, and then finally the campaigns that are made up of the scenarios. When a campaign or scenario is "deployed", the associated service persists the XML definition in a central database or repository.

EJB Implementation

The services described above may be implemented as a set of stateless services—in one embodiment, for example, as a set stateless session beans conforming to the Enterprise Java Bean (EJB) specification. The sections below detail an implementation of the invention that utilizes EJB's to provide the services and functions necessary to support the scenarios and campaigns. It will be evident that other types of resource can be used, instead of or in addition to EJB's.

Scenario Service

The Scenario Service is designed to allow a flow of interactions between the system and a user to be defined as a set of rules and actions.

Scenario Session Bean

The Scenario Service Session Bean is the external interface to scenario functionality. When an event is received by the Scenario Service, it determines if any scenarios in the system should react to the event. If so, the service passes the event on to each scenario that is interested, and then lets them run their rules on the information contained in the event. This session bean also provides functionality to redeploy scenarios and export existing scenarios as XML.

Scenario Objects

A Scenario acts as a wrapper around a RuleSet that contains some additional business logic. When a scenario receives an event from the Scenario Service, it will first do a check to make sure that the Event is meaningful to the scenario. If not, then the scenario will return immediately. Otherwise, if it is meaningful it will pass the information contained in the event to the Rules Service, along with the RuleSet contained in the scenario. Scenario rules produce Action Defs as they fire. After executing the RuleSet, the scenario will use the Action Service to execute the resultant Action Def Objects, if any. This prevents the actions produced by the rules from executing within the Rule Engine thread.

Action Objects

When a Scenario runs a set of rules against an event that it has received, some sort of action will usually be executed as a result of these rules. To accomplish this, the rules create, initialize, and ActionDef objects. These objects must be initialized with the name of the Action they represent, and a map of parameters that the Action will need to run. They are responsible for instantiating the actual implementations of the Action interface, which will do the actual work. This interface comprises of an init method that takes a map of named parameters, and a run method that will execute the action. The rule designer to instruct the rules engine to correctly initialize the ActionDefs with data from the event, the current user, or any other available resource. For example, a Scenario that sends email will contain a rule that returns an Action Def, initialized with a map of appropriate parameters such as the recipients email address and the text of the message, and the name of the Action, SendEmailAction. After the rules are finished executing, the scenario will make the returned ActionDef object retrieve the actual Action implementation. When the run method is called on the Action, it will use the initialization parameters to accomplish its task, which in this case is invoking an email service to send the message.

EJB Ad Service

The Ad Service provides ways to retrieve ads based on the current user of the system. It consists of an AdBucketService session bean that is responsible for managing which ads should be displayed for which users, and a lower level AdService session bean that acts as a pass-thru to the content management service.

Ad Bucket Service

The Ad Bucket Service is a stateless session EJB that provides ad content to placeholders. This is done by looking at ads which target the placeholder and creating a set of valid ads. This set is then passed to an AdConflictResolver which picks the actual ad to serve and updates the ad information. The ad query from this is passed to the AdService to choice the actual ad. If no valid ad is found, then a global ad bucket is checked for ads. The AdBucketService also provides a method to add an ad to a users ad bucket. This is usually called when an event from a Scenario causes an AdAction to be fired. It also provides an interface which will allow campaign state to be cleaned up. More generally, the interfaces will remove content from user buckets based upon the name of a Scenario Container. A campaign is just one implementation of a Scenario container.

Ad Info

The AdInfo is a data struct that contains some subset of the information entered into the Database. Database Table entries for user ad information may include the following:
 username—The name of the user;
 placeholderName—The name of the placeholder that the ad will target;
 scenarioContainerName—The name of the scenario container (Campaign) that generated the ad;
 enterDate—The date/time the ad was entered;
 adQuery—A query passed on to the AdService to generate the actual content for the ad;
 expirationDate—A date the ad expires;
 weight—weight and viewCount are used to choose the add;
 viewCount-; and,
 scenarioName—The name of the scenario that added the ad to the campaign.

AdConflictResolver

The AdConflictResolver is responsible for choosing the "best" ad to display to the user and updating the ad in the database. This method applies an algorithm to a set of ads to choice the "best" one to display. It then updates the weight and viewCount based upon the algorithm.

AdService

The ad service is a separately deployed stateless session EJB which implements the DocumentManager interface and delegates to a DocumentManager. Ad objects may be Document objects deployed in a DocumentManager.

Click-thru Servlet

This servlet is used to track ad click-through events. The content output of the from the AdBucketService will wrap the ad and direct it two this Servlet. The ClickThruServlet is the central place to record user clicks on ads. This may cause campaign events to be raised. The Servlet will redirect the user to the target page after processing the click thru event.

EJB Placeholder Service

A Placeholder represents a named location in a JSP page where content can be placed by the commerce server. It is represented by a placeholder JSP tag. Behind the placeholder tag is the PlaceholderService, a stateless session EJB. The PlaceholderService is responsible for passing content back to the JSP page.

The content is retrieved from a content handler EJB which implements the ContentBucket interface. A content handler is registered with the named placeholder when the placeholder is defined.

PlaceholderTag

The PlaceholderTag is used to place content from the placeholder service into a JSP page. The placeholder is a named entity. The placeholder tag defines four attributes including: name—The name of the placeholder within the system; height—An optional height for the content; width— An optional width for the content; and renderer—An optional named EJB that can transform the content output from the ContentBucket before passing it back through the PlaceholderTag.

PlaceholderService

The PlaceholderService is a stateless session EJB whose primary responsibility is to return content to the PlaceholderTag. In addition, it provides method for the define placeholders, and query for placeholders. The query method can be used by tools to create drop down lists, etc. A define placeholder method defines a new placeholder for the system. The name must be unique and the contentBucketName must be a EJB that defines the ContentBucket interface. Placeholders will be defined within a database table that contains the following information: name—a unique name for the placeholder; type—the name of an EJB that represents the ContentBucket producing; and content for the placeholder.

ContentBucket

The ContentBucket interface defines an interface which the PlaceholderService uses to receive content. This interface will be implemented by "Buckets". The DiscountBucket also is a content bucket.

ContentTransform

This is an abstract base class that implements a transform of the output of a ContentBucket before passing it back to the PlaceholderTag, and acts as a connection point where the system may perform XSLT type transformations to the output of a ContentBucket.

EJB Email Service

The Email Service session bean is a generic platform-level service to provide the ability to send email. It provides real-time email capabilities, as well as batch email capabilities. In the simplest case, an email can be sent by providing a "to" address, subject, and message text. A default "from" address can be specified in the server configuration.

Email Batching

The Email Service also provides the ability to batch a set of emails to be sent later. In the context of a Campaign, this can be used to gradually accumulate emails about a promotion or special offer as users generate events, and then send them all at once when the promotion starts. A batch of emails may be identified with a string id. In the context of a Campaign, this might be the name of the Campaign. Each batch will have a date to determine when it should be sent, or possibly a range, so that emails added to a batch before the start date will be batched, and emails added within the date range will be sent immediately.

EJB Campaign Service

The Campaign Service is the highest level service covered by this document. A Campaign is a sponsored set of scenarios designed to achieve a goal.

Campaign Service Session Bean

The Campaign Service Session bean is the interface between campaigns and the rest of the system. It implements an EventListener interface so that it can receive events that should be processed by the scenarios that make up a campaign. This session bean also provides functionality for tools to deploy new campaigns, and retrieve campaign definitions as XML.

Campaign Object

A campaign contains a set of Scenarios, as well as some information about the campaign itself such as a start and end date.

Campaign Bootstrap

In some embodiments, a campaign may also contain a bootstrap rule that will be executed when the campaign is deployed OR when the server starts up. This bootstrap rule can do things like place entries in the global ad bucket so that users can be shown ad content for the campaign without needing to trigger an event that is recognized by one of the campaign's scenarios.

Part of a campaign definition is a set of date-time and time ranges for which the campaign is active. These ranges can also be negative; for example, there can be a date range from December 18-December 25 and an inactive time range of 8am-11am. This would cause the campaign to consider itself active between the 18th and 25th of December, but not between the hours of 8am-11am. Part of the first "isActive" call to a campaign will be to check these date ranges against the current date/time so that the call can be short-circuited without firing up the rules engine.

Additionally, in some embodiments an activation rule can be defined for a campaign. The activation rule can return either true or false, and will be called after the active date range is validated. This provides an alternate method of short-circuiting the call prior to running all the rule sets that belong to the campaign's scenarios. The activation rule also provides a way to stop the campaign from executing once a "goal" is met, by having the rule check for the goal condition, and return false if it has been met.

Receiving an Event

When a campaign receives an event through the Campaign Service, it will first check to make sure that it is active by looking at its start and end date range, as well as any defined time ranges, and then possibly running its activation rule. If either of these checks fails, the campaign is considered inactive, and will not execute further. If the campaign determines that it is active, it will pass the event to each of its scenarios, so that they can all act on the event by running their rule sets, and executing any actions that result from that.

Cleaning Up After a Campaign

In accordance with one embodiment, campaign definitions can also include a "cleanup rule" that will be executed when the campaign is undeployed. This will give the campaign a chance to delete any information that may have been created during its run, like ad queries in ad buckets. Like the rules in a scenario, this rule will return zero or more Action objects that can be executed to do the cleanup. It will be evident that alternative methods of cleanup can be used.

Deployer Service

The interface to the deployer component is the DeployerServlet. This is a standard servlet that will accept a stream of XML, which contains data to deploy, and route that stream to an appropriate helper class. The servlet's configuration information will contain information mapping XML document types to implementations of a DeployerHelper interface. When the servlet receives the XML data stream, it will examine the document type, and instantiate the correct DeployerHelper implementation to handle it. Each DeployerHelper implementation will know how to deploy the data from the XML stream. This is up to the individual component; it could be calling a session bean to handle the actual deployment, or it could be entering the data in the database directly.

EJB Event Service

The campaign and scenario have a requirement to have potentially synchronous event handling, in addition to asynchronous event handling via JMS. In the Event property set type, the name of each property set will correspond to an Event type. This mechanism will allow the editors to be extended as we or our customers add new event types. The following Event types and property set are supported, although it will be evident that additional Event types can be supported within the spirit and scope of the invention:

| Property Name | Type | Description |
|---|---|---|
| *Login Event* | | |
| user | User | The user who logged in. |
| userId | String | The id of the user who logged in. |
| applicationBase | String | The base URI of the application (e.g. "/portal/application/exampleportal"). This might be null. |
| *Logout Event* | | |
| user | User | The user who logged in. |
| userId | String | The id of the user who logged in. |
| applicationBase | String | The base URI of the application (e.g. "/portal/application/exampleportal"). This might be null. |
| *Ad Impression Event* | | |
| user | User | The user who logged in. |
| userId | String | The id of the user who logged in. |
| campaignName | String | The name of the campaign the ad was displayed for. |
| scenarioName | String | The name of the scenario the ad was displayed from. |
| adId | String | The identifier of the ad. |
| placeholderName | String | The name of the placeholder the ad was displayed in. This might be null. |
| *Ad Clicked Event* | | |
| user | User | The user who logged in. |
| userId | String | The id of the user who logged in. |
| campaignName | String | The name of the campaign the ad was displayed for. |
| scenarioName | String | The name of the scenario the ad was displayed from. |
| adId | String | The identifier of the ad. |
| placeholderName | String | The name of the placeholder the ad was displayed in. This might be null. |
| *Checkout Event* | | |
| user | User | The user who logged in. |
| userId | String | The id of the user who logged in. |
| shoppingCart | Shopping Cart | The user's shopping cart object at the time of checkout. |
| *Add to Shopping Cart Event* | | |
| user | User | The user who logged in. |
| userId | String | The id of the user who logged in. |
| item | ProductItem | The ProductItem added |
| quantity | Integer | The number added |
| *Remove from Shopping Cart Event* | | |
| user | User | The user who logged in. |
| userId | String | The id of the user who logged in. |
| item | ProductItem | The ProductItem removed. |
| quantity | Integer | The number removed |

Typical Implementation

The following section describes a typical implementation of a personalization system in accordance with one embodiment of the invention. It will be evident that alternative implementations can be used within the spirit and scope of the invention.

Figure 5:
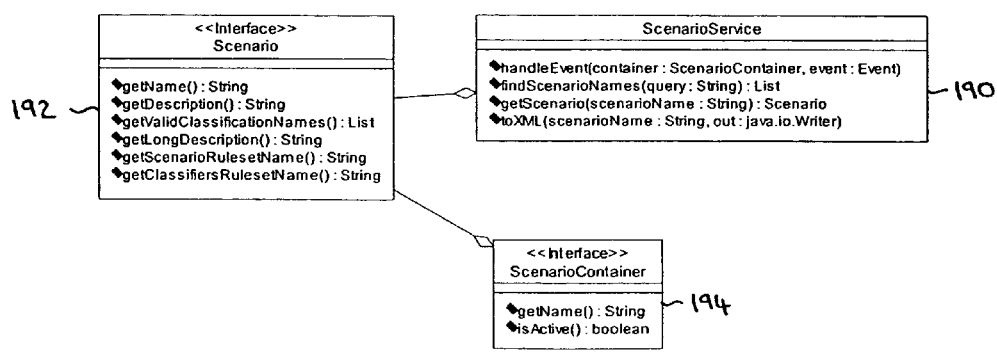
FIG. 5 shows a model of a scenario interface in accordance with an embodiment of the invention.

FIG. 5 shows a model diagram of one implementation of the scenario service that illustrates how the scenario service can access scenarios using either the name or search pattern. As shown in FIG. 5, the scenario service includes a mechanism for handling events, and for finding scenarios or retrieving scenarios by name, the scenario service 190 uses a scenario interface 192 to look up or save scenarios by name, description, classification name, long description, scenario ruleset name, or classifier ruleset name. An XML interface allows the scenario service to read scenarios from an XML file, and to save modified scenarios to an XML file. A scenario container interface 194 is used to specify whether a scenario is active or not.

Figure 6:
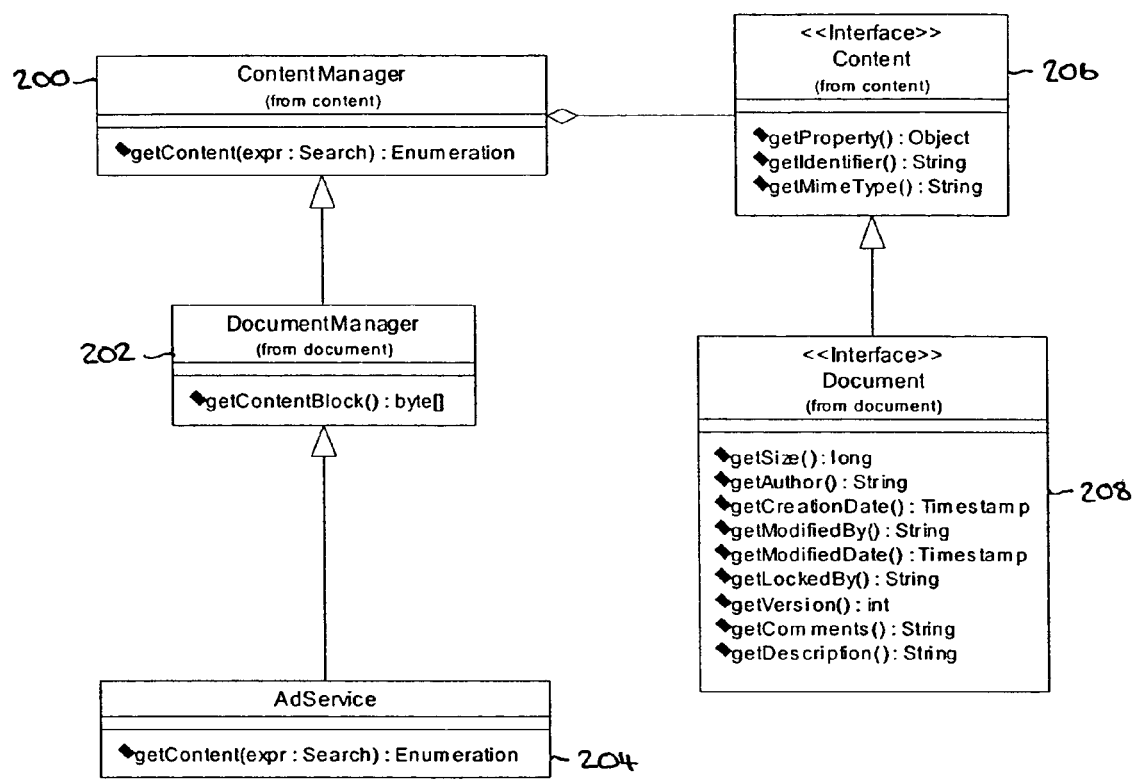
FIG. 6 shows a model of a document interface in accordance with an embodiment of the invention.

FIG. 6 illustrates how the content manager is used to provide content to the user in one embodiment in the invention. As shown in FIG. 6 the content manager 200 retrieves data input from a document manager 202 and an ad service 204, using a content interface 206. A document interface 208 allows additional information about the document to be saved and/or edited including the author version number, etc.

Figure 7:
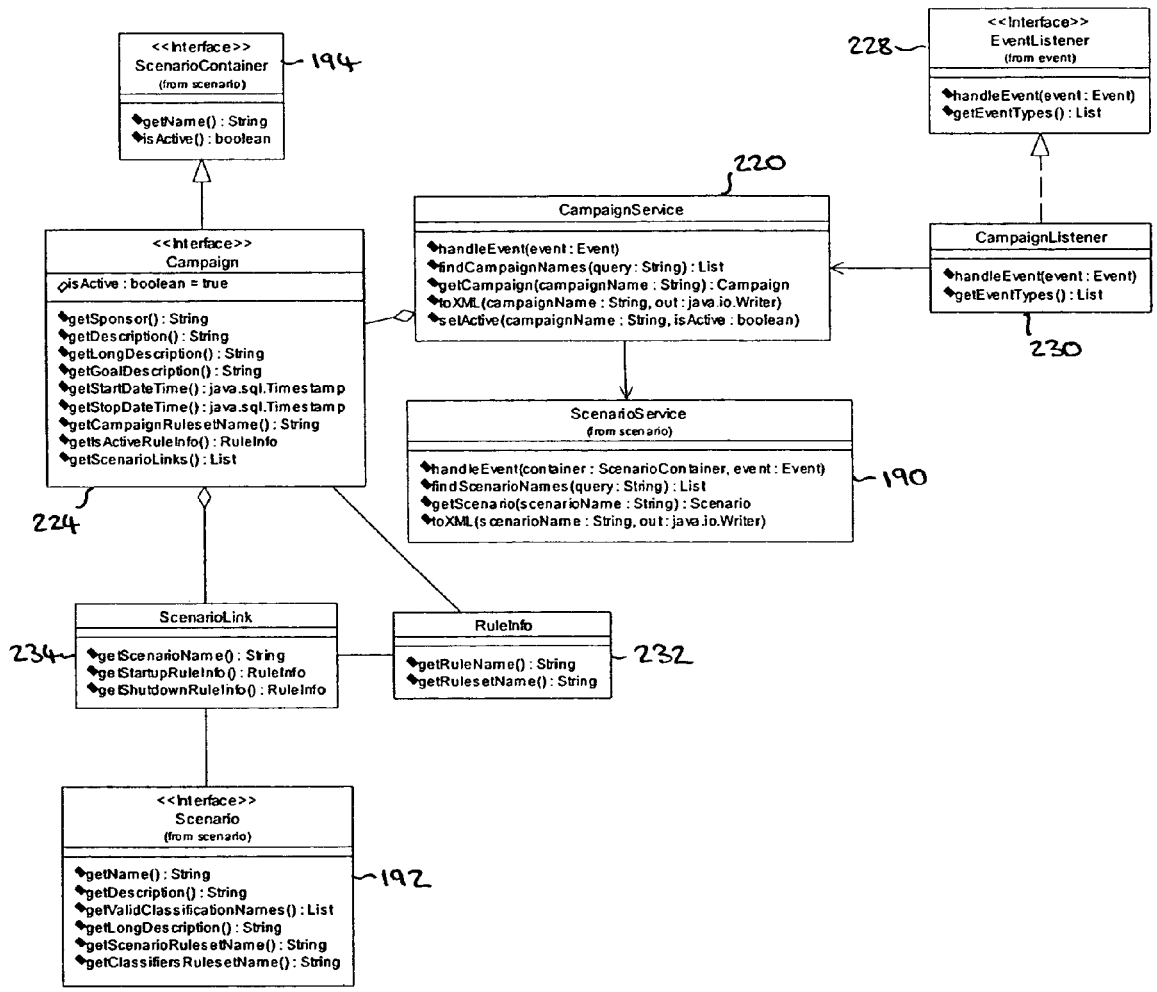
FIG. 7 shows a model of a campaign service in accordance with an embodiment of the invention.

FIG. 7 illustrates a model of one implementation of the campaign service that is used to respond to events as they happen. As shown in FIG. 7, the campaign service 220 and the scenario service 190 use information from the rulesets via a campaign interface 224 feed information to the scenario container 194 for use in displaying content. A campaign listener 230 receives information about happening events (regarding login, page hits, click-through, etc) from an event listener 228, for use by the campaign service 220. The campaign interface 224 uses rule information 232 and a rules-based scenario link 234 to access the scenario interface 192.

Figure 8:
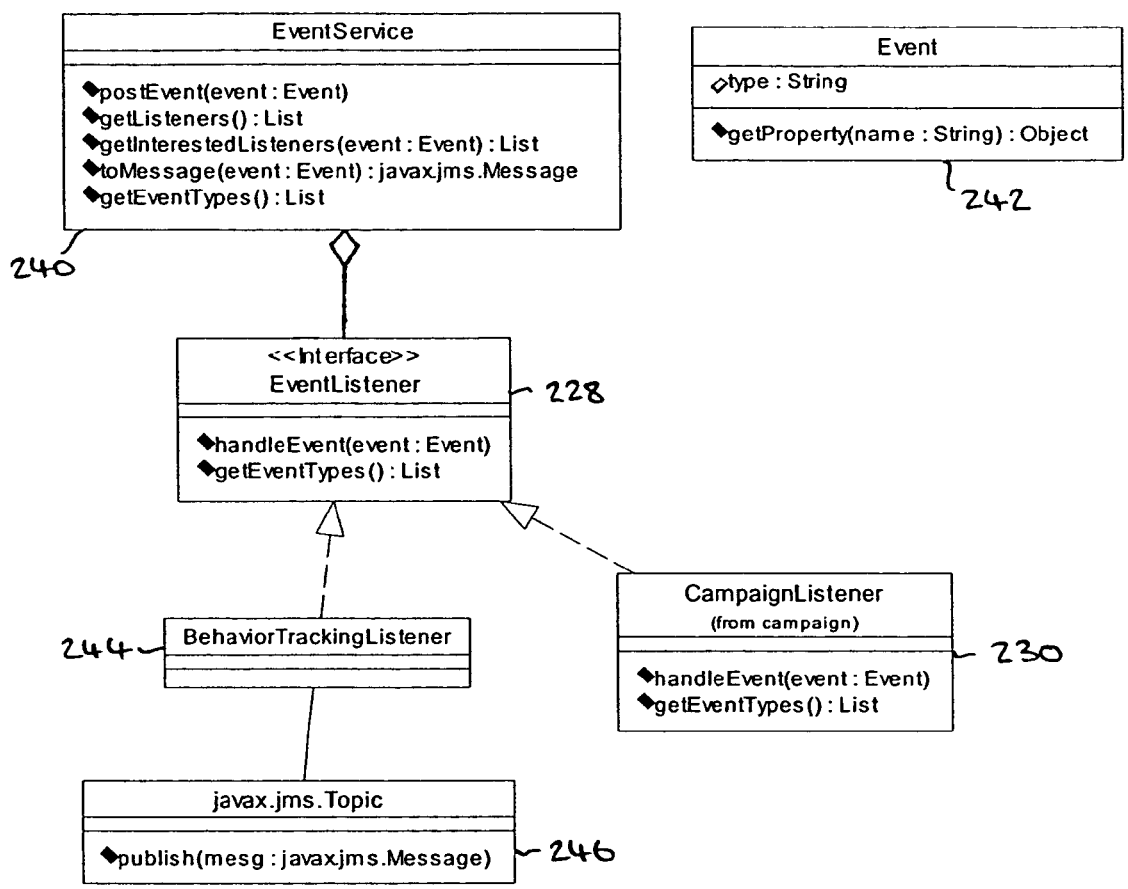
FIG. 8 shows a model of a behavior tracking listener in accordance with an embodiment of the invention.

FIG. 8 shows a model of a event service 240, that uses an event listener interface 228 to receive notification of events 242. This information is intercepted by the campaign listener 230, to determine events of current interest to the system and the present user. In one implementation the event service can be modified by a behavior tracking listener 244 which uses information on a user's behavior to help determine the possible event types that will be monitored. A standard Java JMS method 246 can be used to publish events to the behavior tracking listener 244.

Figure 9:
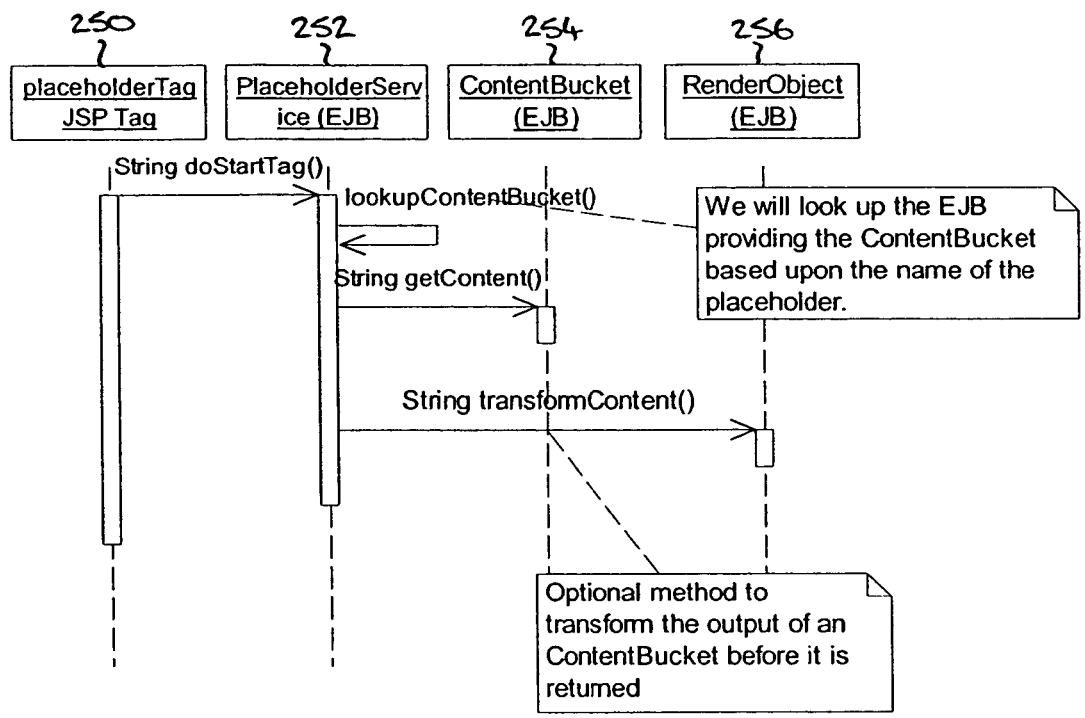
FIG. 9 shows a lifecycle diagram of a placeholder determination process in accordance with an embodiment of the invention.

FIG. 9 illustrates a lifecycle showing how in one embodiment a placeholder tag can be used to retrieve content for subsequent display on the user's screen. As shown in FIG. 9, when the placeholder tag or JSP tag 250 on the user's screen is activated it causes a call to be made to the placeholder service EJB 252. The placeholder service EJB in turn makes a call to the content bucket 254 based upon the name of the placeholder, followed by a request to get content. This content is then returned to the user by typically as a display on the user's screen. An optional request to a render object EJB 256 can be made to transform the output of the content bucket into some other format before it is returned or displayed to the user.

Figure 10:
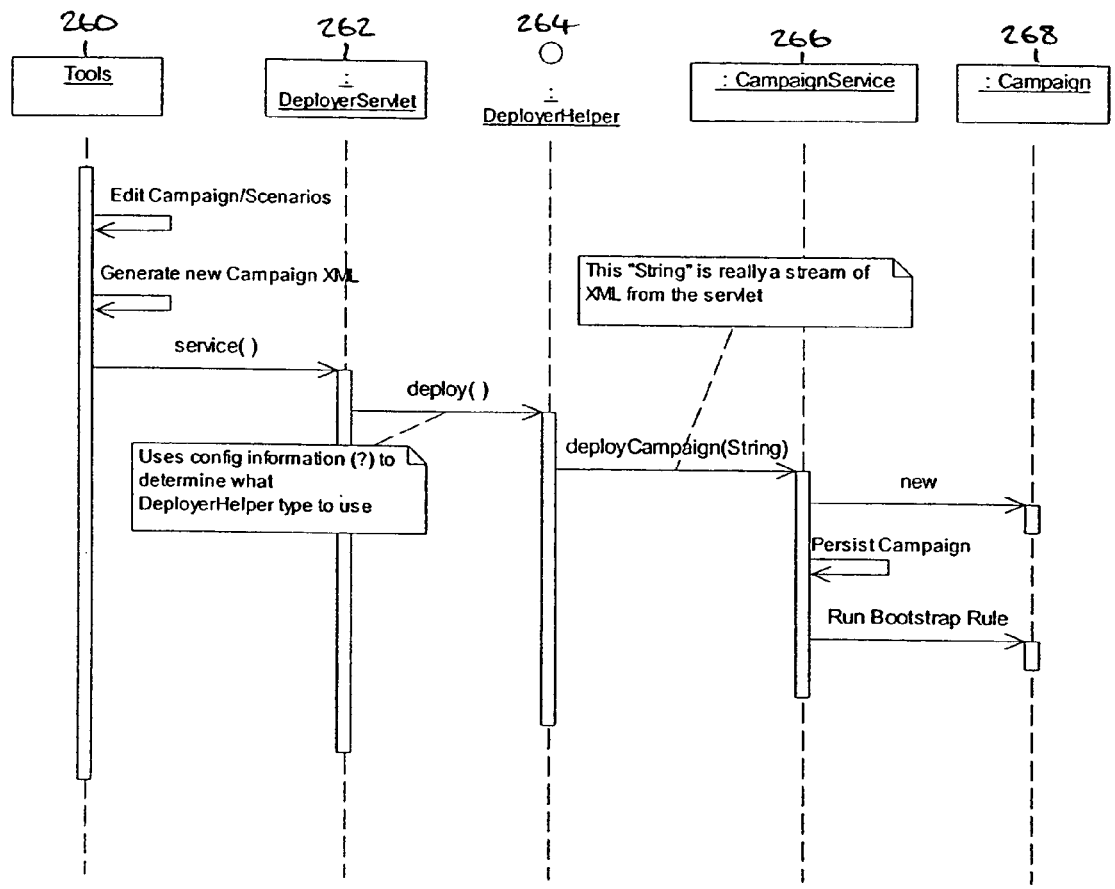
FIG. 10 shows a lifecycle diagram of a campaign deployment process in accordance with an embodiment of the invention.

FIG. 10 illustrates a lifecycle that shows how administrative and editing tools (including graphical user interfaces) can be used to edit campaigns and scenarios, and then to deploy the campaign at the campaign service for use in the subsequent personalizing of data on Web content for the user. As shown in FIG. 10, tools 260 can be used to edit campaign scenarios directly or via a GUI interface, or can be used to generate new campaign XML filer which define the campaign. When the campaign is satisfactorily configured, a request to a deployer servlet 262 is made to deploy the actual campaign. The deploy function uses deployment configuration information to determine which deployer helper type 264 to use, if many exist. The campaign is then deployed to the campaign service 266. At any subsequent point in time, the campaign 268 can be automatically or manually activated by a bootstrap rule or routine and then can be used by the system in personalizing content.

Figure 11:
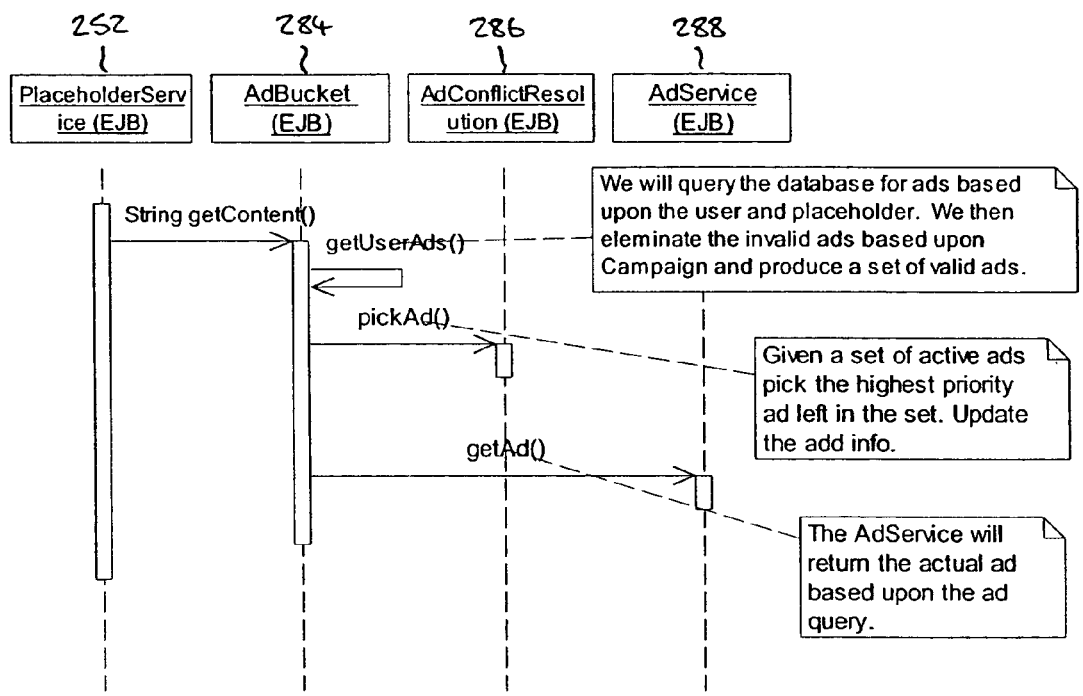
FIG. 11 shows a lifecycle diagram of an ad service process in accordance with an embodiment of the invention.

FIG. 11 illustrates a lifecycle in which the placeholder service EJB 252 uses an ad bucket EJB 284, and ad conflict resolution EJB 286 in order to provide ads to the user. As shown in FIG. 11, the "get content" call to ad bucket EJB 284 is used to get a selection of ads from the database based upon the user's current information, profile, or session and the ad placeholder. The system then eliminates invalid ads based upon the campaign rules and produces a set of valid ads for communication to the user. If necessary, an ad conflict resolution EJB 286 is used to pick ads of the highest priority. The get ad method then returns the actual ad to the ad service 288 based upon the results of the ad query.

Figure 12:
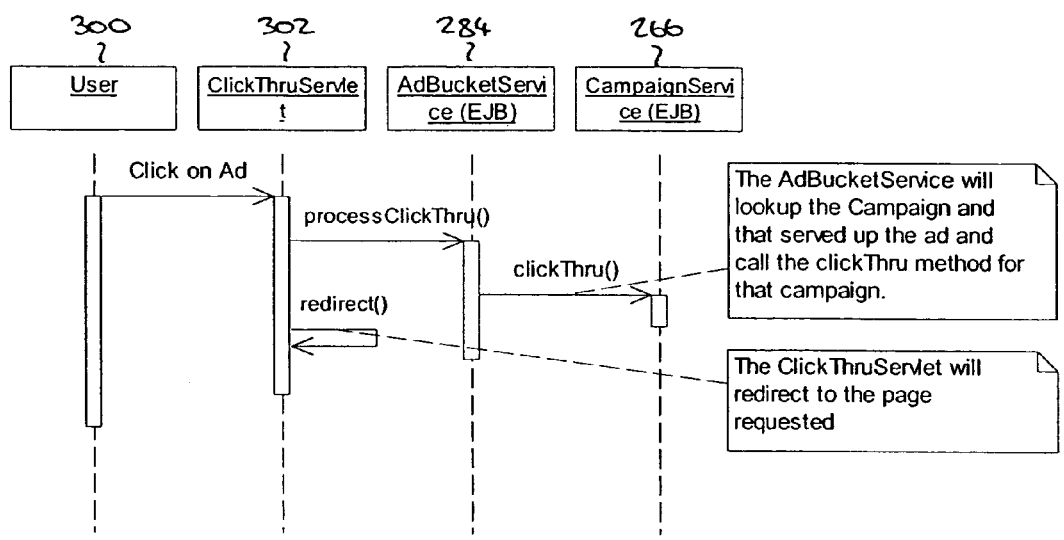
FIG. 12 shows a lifecycle diagram of a click-through service process in accordance with an embodiment of the invention.

FIG. 12 illustrates a click through servlet lifecycle, showing how the user 300, upon clicking on a particular ad sends a method to the click through servlet 302. The click through servlet contacts an ad bucket service 284 that uses the campaign service 266 that looks up the campaign that served the ad and calls the appropriate click through method for that campaign. The ad bucket service is then used to redirect the user based upon the click through.

Behavioral Tracking

Some embodiments of the invention are particularly useful for tracking users actions on a Web-site, and for using this tracked information to modify the Web-site content accordingly. In order to track users' interactions with a website, a behavior tracking system can be used to store this data for future analysis. Generalizing the event mechanism involves two major tasks.

The event types must be decoupled and defined in terms of the context in which they will be used. Display events must be defined for a general page view, product view, and ad view. The same is true of ClickEvents. In addition, the definition of the other events must be sharpened and finalized; and, The event service must be generalized in order to decouple the content of the events from the mechanism. In one embodiment all events are stored in a single database table. A single listener will receive an event from the event service and will pass that event to the single persister. The single persister will call a helper method to create an XML string that will be stored in the database; the data will then be stored in the single database table.

The events that can be tracked include:

SessionBeginEvent—Marks the beginning of any user's session. User does not have to be logged on for the user to be in a session. However, if a user is logged on, they still retain the same session ID they had prior to login. An anonymous user will have a session ID, but not have a user ID until they log on (authenticate). Generated when user's session begins.

SessionEndEvent—Marks the end of any user's session, regardless of whether that user has logged on. Generated either by session timeout or user logout.

SessionLoginEvent—Denotes that a user has authenticated. We assume we have user profile information access at this time. The same session ID the user had prior to logging in will be used. Generated when user supplies login information.

UserRegistrationEvent—Denotes when a new user has registered at a site. Generated when user successfully completes registration forms.

AddToCartEvent—Customer adds product to cart. Generated when customer adds a product to their shopping cart.

BuyEvent—Customer purchases product. Generated when customer enters checkout; one per product.

RemoveFromCartEvent—Customer removes product from cart. Generated when customer removes a product from their shopping cart.

RuleEvent—A rule has fired. Generated usually in the context of a scenario (see description above). However, rules may be fired independent of a scenario.

DisplayContentEvent—An image is displayed to screen, independent of a campaign. Generated when "tagged" content is shown.

ClickContentEvent—An image on the screen is clicked on, independent of a campaign. Generated when "tagged" content is clicked on.

DisplayProductEvent—A product is displayed on the screen. Note that product is not tied to a campaign. Generated when "tagged" products are shown.

ClickProductEvent—A product on the screen is clicked on. Generated when "tagged" products are clicked on.

DisplayCampaignEvent—An image that relates to a campaign is displayed to screen. A scenario may have multiple displays associated with it. Generated when the campaign/scenario has specified that this particular content is relevant to the scenario and should be displayed while the scenario is active.

ClickCampaignEvent—An image that relates to a campaign is clicked on. A scenario may have multiple click events associated with it. Generated when the campaign/scenario has specified that this particular content is relevant to the scenario is clicked on.

CampaignUserActivityEvent—A generic event for capturing user activity within the context of a campaign. Used to log that a user was exposed to a particular campaign. Used if there was not a DisplayCampaignEvent or ClickCampaignEvent.

Figure 13:
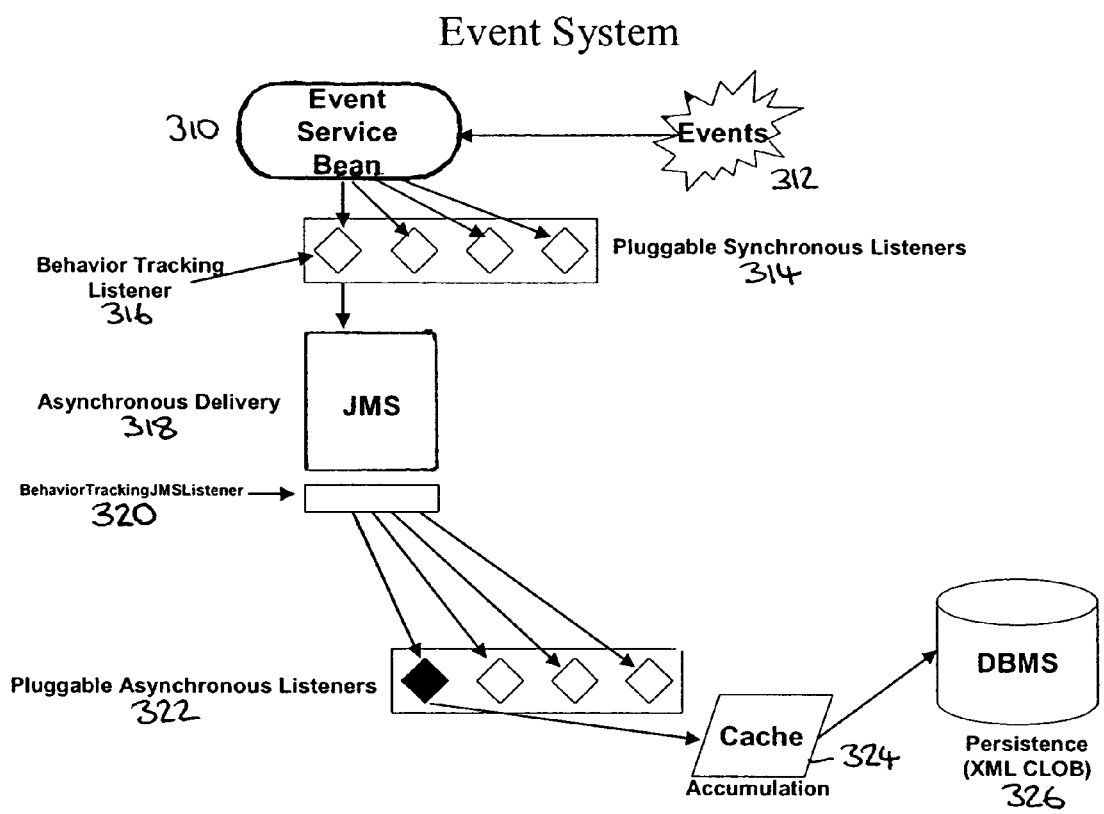
FIG. 13 shows a schematic of an event service behavioral tracking listener in accordance with an embodiment of the invention.

FIG. 13 illustrates one implementation of how an event system can be used to feed events to this system for use in personalizing content or business functions. As shown in Figure 13, an event service bean 310 is used to feed notice of events 312 into one or more pluggable asynchronous listeners 314, including in one embodiment of the system a behavioral tracking or listener module 316. Each listener has a list of event types for which it listens. When the BehaviorTrackingJMSListener receives an event of that type (for example, foo), it transmits the event of type foo to every listener that lists foo in the String array returned from a getTypes( )call on the listener (the call is invoked by the BehaviorTrackingJMSListener). The Java Messaging Service (JMS) 318 is used to deliver individual event messages to a JMS listener 320 and to a set of pluggable asynchronous listeners 322. The listeners have no knowledge of JMS. For example, to plug in a listener interested only in campaign events, the listener' s classname would have to be listed in a properties file as a behavior tracking listener, the listener must implement void handleEvent(Event e), and the listener' s String] getTypes( ) call would need to return an array containing {"ClickCampaignEvent", "DisplayCampaignEvent", "CampaignUserActivityEvent"}Events, of one of these three types, would then arrive and be handled at the listener' s handleEvent(Event e) interface. The BehaviorTrackingJMSListener subscribes to the JMS topic to which events are transmitted from a synchronous, JMS-aware listener. It then sends events to the pluggable asynchronous listeners who are interested in events of certain types. The events may be cached 324 and then stored in a database (DBMS) 326 for use in generating content. It will be evident that other means for communicating events to the system can be used.

The Event Table

In one embodiment the tracking event table structure uses a single table that facilitates storing data from all event types. This embodiment of the table has five columns as shown below, although alternate variations can be used:

EVENT_ID
EVENT_DATE
EVENT_TYPE
WLS_SESSION_D
USER_ID
XML_DEFINITION

The first five items are common to all types of events that are captured and stored in the database. The final item, XML_DEFINITION, represents an XML document that is stored as a CLOB in the table. XML_DEFINITION stores the first five items above and the event specific data that may differ between all of the event types. This XML document is created specifically for each event type.

Administrative Tools and Editors

Figure 14:
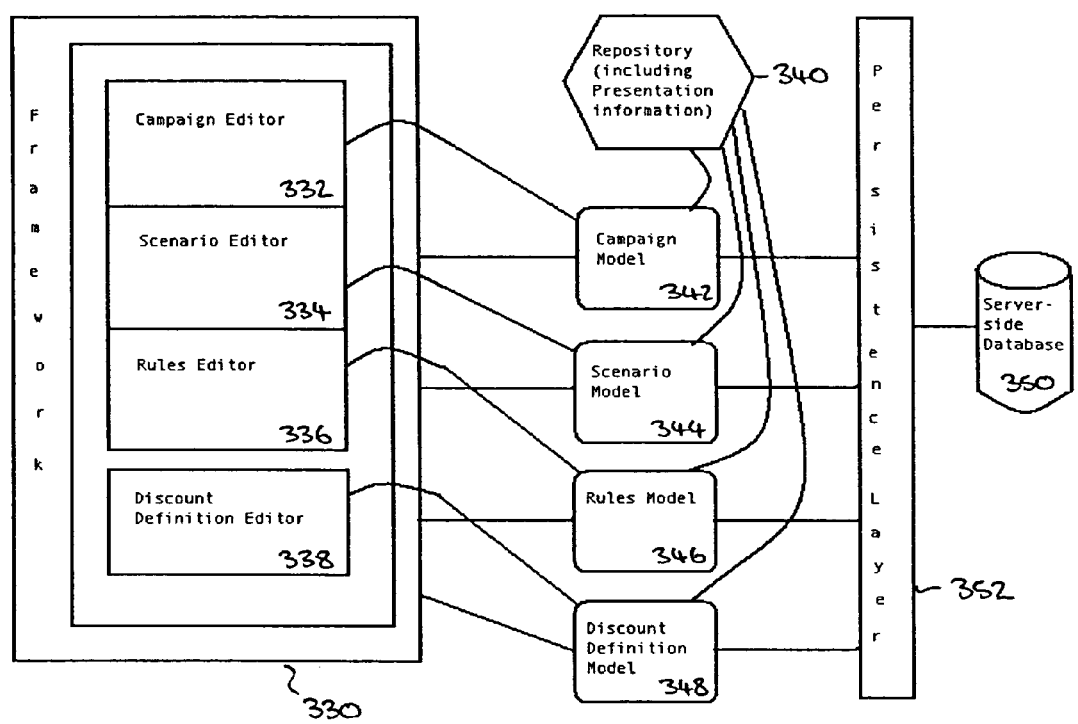
FIG. 14 shows a schematic of a tools framework in accordance with an embodiment of the invention.
Figure 15:
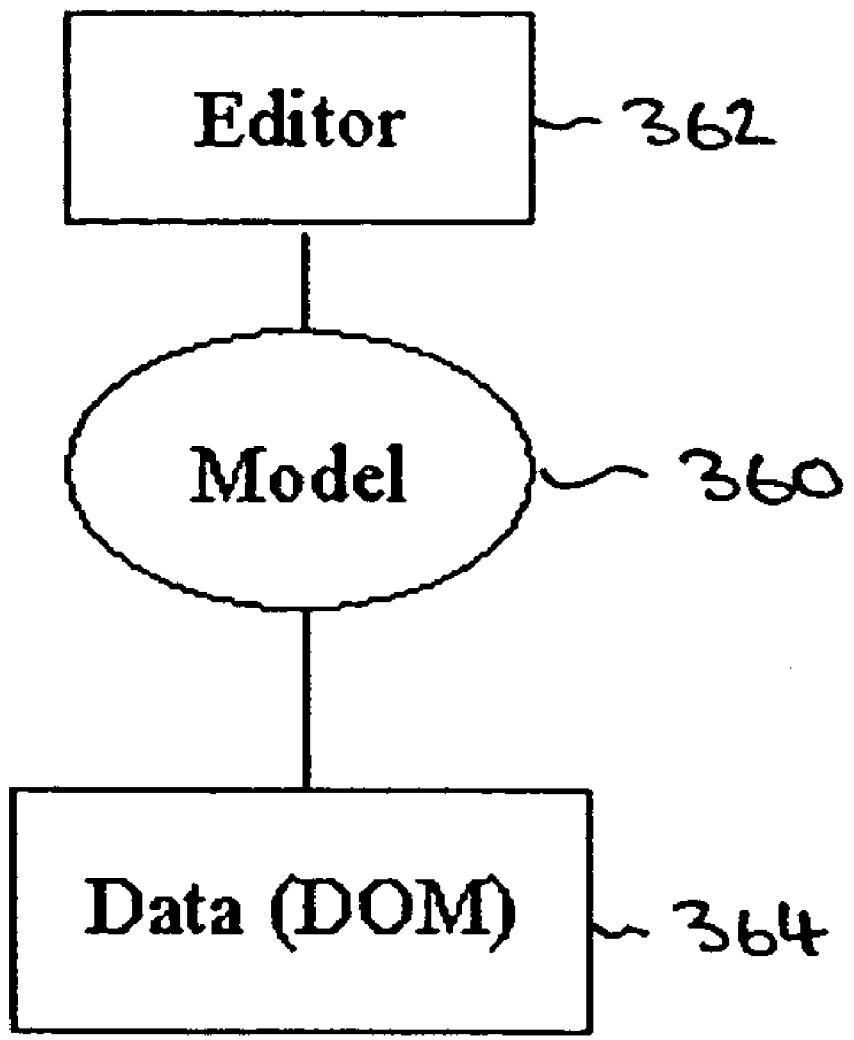
FIG. 15 shows a schematic of the positioning of the editor, data, and model within the tools framework, in accordance with an embodiment of the invention.

The administrative tools feature can be split into several main components. FIG. 14 illustrates one implementation of an administrative tool set, that allows an administrator to modify rules and/or campaign scenario rulesets, and also allows them to edit action types, including for example discount definitions that may be used with the invention. As shown in FIG. 14, the administrative software acts as a tool framework 330 and may include a campaign editor 332, scenario editor 334, rules editor 336, and discount definition editor 338. Other rule editors may be added as necessary. The editors are used to modify the system repository 340, which includes data related to the campaign model 342, scenario model 344, rules model 346, and discount definition model 348. The repository is connected to a server side database 350 by a persistence layer 352 which allows data to be dynamically updated during the run-time execution of the personalization engine.

Editors—The actual widgets, icons, and other UI features that the administrator will be interacting with to create a campaign, scenario, ruleset, or discount definition. This is independent of any tools framework, keeping the editors as reusable as possible. The tools framework will create and listen to the models to facilitate the presentation inside a UI and persistence of the underlying objects. Editors also have access to a Repository object that contains information from the outside world such as list of presentation templates, available properties, etc.

Presentation—The information on how a campaign, scenario, or rule is displayed in readable and understandable form to a administrator. The presentation data is used by the Editor, and can be unique to a locale (or even to a business).

Model—The way the Editors interact with "the world". Each Editor's Model handles giving the Editor what it needs such as a DOM of data. The Model also listens for events on the DOM and possesses the appropriate mechanisms for firing its own events, listened to by the tools framework (to alert the need to save a ruleset, for example).

Tools framework—A surrounding infrastructure to house the specific Editors. The tools framework displays the lists of campaigns, scenarios, rulesets, and discount definitions. It also handles saving, loading and deleting of what is created within the Editors (via the Model and Persistence layer) through toolbars, menus, or other similar interfaces.

Data—The information about the actual rules, scenarios, campaigns, and other constructs edited within the tools. These pieces of Data live within a DOM (or DOMs) created from XML.

Persistence—How the Data is loaded into the Model and how it is saved after creation or editing in the Editors.

Rules Editor

The Rules Editor is the foundation of most of the other administrator tools. Campaigns and scenarios are made up of rules (within rulesets). Thus, in order to edit the rules within the scenarios and campaigns, the Rule Editor must be used.

Rulesets

When the Rules Editor is invoked, the "unit of work" is a ruleset. A ruleset is a collection of related rules, bundled so that the Rules Engine can use them together.

Classifiers

The Classifiers ruleset is a special case. Because Classifications (perhaps the fact that the user is a "Gold Member", for example) need to be re-used in any campaign, scenario, or rule, having a single ruleset per application that stores all Classifications that are to be re-used makes life much easier (for us). Thus, there will be a special Classifier ruleset that contains only Classifier rules. Note the difference between a Classifier and a Classification. A Classifier is a rule type whose right-hand side asserts a Classification object. For example, in the Classifier "If the visitor's home state is Colorado, then classify the visitor as a Skiier", the classification "Skiier" would be what is reused in other rules. ("If the visitor is a skiier, then show the Vail Ad in the Left Ad Holder". A Classifier rule is not used within another rule—only a Classification.

XML->HTML-like reader

The Model gives the Rules Editor a ruleset DOM to work with when the Rules Editor is started. When a rule within the ruleset is selected, the Rules Editor must be able to display the rule's Data contained within the ruleset DOM, as well as the Presentation information DOM necessary to show the rule properly. The Rules Editor needs to be able to turn both DOMs' information into a readable rule with hyperlinks for the parameterizable sections.

Phrase Editors

When a hyperlink (parameterizable area) is clicked in a rule, the presentation DOM needs to know what phrase editor to open. A Phrase Editor is a dialogue used to get a specific value for use in the rule. For example, a date and time selector, or a property picker.

Scenario Editor

The Scenario Editor edits a ruleset just as the Rules Editor does. The only difference between the two is that a Scenario is started from a template (an "Ad Scenario" template, for example), and the Scenario has a bit of metadata about it (a description, for example). In other words, most of the functionality (rules) used within the Scenario Editor is nested within the embedded Rules Editor. A Scenario is essentially a ruleset and some metadata. The scenario Data contains this metadata and a link to a ruleset. The Scenario Data also contains a link to the Classifier ruleset, so that Classifications created within the Classifier rules can be used within the Scenario's rules.

Campaign Editor

The Campaign Editor can have multiple scenarios within it, as well as a ruleset of start and end conditions. There is also campaign metadata, such as a sponsor, a description, and searching information (start and end dates, etc). The Campaign Editor uses the Scenario Editor and the Rules Editor when it adds or modifies Scenarios. Campaign Data has links to every ruleset used within, including the Scenarios, the start/end condition ruleset and the Classifier ruleset.

Discount Definition Editor

The Discount Definition Editor is only related to the Campaign, Scenario, and Rules Editors in that rules created within the Rules Editor can refer to discounts created within the Discount Definition Editor (discounting type rules).

Presentation

A Classifier such as "If the visitor's gender is male, then classify the visitor as a beer drinker" has not only Data such as "gender", "male", and "beer drinker", but also Presentation information about how a Classifier show be displayed ("If the visitor's . . . "). This Presentation information is stored outside of the Editors themselves, so that different Presentations can be plugged in for different uses (such as different locales or a specific Presentation for a business or vertical market).

Schemas

For each Editor (Campaign, Scenario, Rules, and maybe Discount Definition), there is an XML schema governing how any Presentation XML for that Editor must be structured.

Presentation XML

Given a schema, each Editor needs default Presentation XML. This includes rule text for every type of rule (Classifier, Content Selector, Placeholder Content Selector, Send E-mail, Discount), and display information (maybe just metadata names, maybe more) for scenarios and campaigns.

Model

Each Editor, while knowing how to handle a specific kind of Data and Presentation DOM (campaign, ruleset, etc), should not necessarily have to do all transversal, update, and other activities with the DOM. Each Editor has an associated Model that handles much of the "grunt work", providing useful methods for the Editor.

Convenience methods

The Model for each Editor provides convenience methods that the Editors can use to get or set values from the DOM. For example, a campaign Model might provide a method String getSponsor( ) that traverses the Data DOM to get the sponsor for a campaign.

Events

Each Editor's Model also provides event listening and firing mechanisms so that it is the model's job to inform the tools framework of such things as the "dirtying" of data (meaning the Save button is enabled), based on events fired from the Editor.

Repository

The Model for each Editor possesses a Repository of information relating to the Editor. The Repository may contain such information as template lists, and may also hold the reference to the Presentation DOM for each Editor.

Tools Framework

The tools framework is the outer layer of the GUI, and houses the various Editors within. The tools framework is responsible for displaying the sets of campaigns, scenarios, rulesets, and discount definitions. The tools framework also performs saving, opening, and searching (Campaign lookup, for example) tasks. The tools framework never communicates directly to an Editor—it is always done through the Editor's Model.

Data

The word "Data" in this document refers to the information the administrator user is trying to create, update, or delete by using the tools. Data could be a ruleset, a scenario, a campaign, or discount definition.

Templates

The template concept is key for the administrator tools. By providing templates at each level (campaign, scenario, rule, and rule clause), the tools make it very easy for the administrator user to create quickly whatever they need to do. By making the templates pluggable (new templates can be created later on), a great deal of power and flexibility is provided.

A template is simply an unparameterized version of a scenario, campaign, or rule (or rule clause). A template provides basic structure, but the Editor should allow modification of a campaign, scenario, or rule started from a template into whatever the administrator user desires. For example, a user could start with an e-mail scenario template and by adding and removing rules, end up with a scenario that discounts a product and sends no e-mail at all.

Discounts

Some embodiments of the invention allow a user, for example in a Web environment to offer discounts to certain customers. In these embodiments all discounts have unique identifiers. Through a scenario, it is possible to associate a discount to a user.

Discounting is a portion of the promotions functionality that honors monetary promotions extended to a customer by the campaign service, or possibly yet to be developed functionality. Discounting includes defining of discounts and applying those discounts through a pricing service that works on orders or shopping cart contents. Specifically the pricing service will apply a set of discounts to a set of products to maximize the monetary benefit to the customer. Many other services provided by the commerce server will interact with discounting functionality and therefore a number of dependencies and impacts on those services exist.

Customer—The browser-based user who interacts with the commerce site. Also includes computer systems that interact with the commerce site.

Developer—General term for any person operating, configuring, maintaining or developing on the commerce server.

Commerce Engineer, Commerce Manager—Advanced level developer with responsibility for managing the business functions.

Discount Tool—A tool for defining discounts.

Embodiments of the invention provides for a software facility deployed within the commerce server to facilitate providing discounts to customers. Discounts may be provided to all customers or to particular segments of customers. Discounts may always be in affect or may have conditionals that dictate when or under what circumstances the discount is available. In some embodiments, the system includes a dynamic pricing service which executes the discounts against a specific product or set of products to produce the cost of the product or products to the particular customer at the particular time. Although the promotions functionality (the presentation of an offer to the customer other than through the product catalog) is external to the discount system the dynamic pricing service can honor offers made through the promotions facility.

The discount system includes dependency and inter operability with the shopping cart, catalog, checkout and order management systems. The system can stand alone or allow third-party developers to provide there own integration of their catalog and order systems. Tools may be used to maintain discount definitions.

The discount system has two primary use cases. The first involves the developer interfacing with the discount configuration system. The second involves the customer interacting with the catalog, shopping cart, checkout and indirectly with the pricing service. A third use case exists where a developer interfaces to the pricing service to perform an unspecified task.

Embodiments of the invention provide a mechanism that allows the discount system to honor offers presented to customers through the promotion system. The mechanism is termed the discount indication mechanism.

The promotions facility makes all determinations based on user attributes whether a particular user discount applies to a user. After making this determination the promotions facility updates a discount indication mechanism with a user identifier and a discount identifier. The discount indication mechanism is referred to, in the rest of this specification, as the customer discount association.

The discount system provides customer targeted discounting of a qualification style. The basic premise of qualification discounting is that a discount definition describes the items (and in what quantity) required to qualify for a discount (qualifying items) and the items that are to receive the discount (target items). In general, the qualifying items may or may not be the same as the target items. For simplicity, in one embodiment, the qualifying and target items may be required to be the same set of items.

Application of discounts is done in the context of a collection of objects (order, shopping cart, etc.). When a discount is applied to the collection the set of objects matching the discount definition is removed from the collection and the target items are discounted per the discount definition. Additional discounts are applied until there are no more discounts, no more objects in the pool or no discounts that match the remaining collection objects. More specifically, the pricing service will apply the discounts to the given object collection in such a manner as to maximize the monetary savings to the customer.

The discount system may also provide a mechanism for associating sale discounts with particular product items or categories. Sale discounts can be applied prior to any qualification discounting.

Application to Web-based Personalization and Ecommerce Management

In accordance with one embodiment of the invention, a Personalization Rules Editor allows business users to manage customer relationships and fine-tune user-system interactions using a task-driven interface and easy-to-use rule editing templates. The Personalization Rules Editor drives an embedded rules engine, and eliminates the need to master complex Boolean logic to create and edit rules, allowing business people to focus on creating business rules that manage customer interactions.

Behavior Tracking records page impressions, click-throughs, "add-tos" and removals from shopping carts, and purchase and order histories, for use in analysis of customer shopping and buying patterns.

Placeholders and Promotions are an easy way for business users to specify where promotional content will appear. Once Java Server Page (JSP) page tags are in place on the pages, placeholders eliminate the need to reprogram the application every time content on the pages needs changing. Users simply point and click to choose and place content on pages using the administration tool.

An Email Service provides the ability to send personalized emails triggered by user events.

Discounts and Pricing can be applied in a variety of ways including percentage off, fixed amount off, and fixed price. Discounts may be applied to product items, whole orders, or shipping. Cross-sell and up-sell scenarios can be combined with discounts to create strong incentives.

The web-based Personalization Server enables management of customer relationships to win and retain customers. A business must quickly attract and retain customers to achieve competitive advantage and market leadership. The Personalization Server provided by the invention enables adaptable e-commerce applications that personalize customer interactions and drive online sales. Information can be captured about customers and shared with the business processes inside and outside the enterprise, and used it to enhance customer experience. Capturing this information, and using it to personalize future interactions, ensures that the e-business delivers highly relevant information to customers.

The Personalization Server includes complete personalization capabilities, and a rich set of pre-built templates and commerce functions, to quickly assemble adaptable solutions that respond to the needs and interests of customers and targeted customer segments. The portal framework included in Personalization Server allows developers to quickly build portal sites using a my Portal-style interface. This new framework enables users to personalize the content, layout, and overall appearance of the portal according to their own preferences, as well as manage their profiles. Also included are essential tools for integrating with leading e-analytics e-marketing systems, and creating and managing personalized content utilizing either out-of-the-box solutions or integrated content management packages. The customer experience can be personalized based on responses to outbound marketing campaigns, and response information analyzed to further segment customers for deeper personalization.

Using a task-driven, user-friendly GUI tool, the powerful personalization capabilities of Personalization Server can be directly accessed by business managers.

Benefits provided by the invention include:

ABy to personalize and deepen customer relationships with enhanced e-business content management and personalized business scenarios.

Time-to-market and competitive advantage with a suite of e-commerce components and templates that can be quickly customized.

Reduction in cost and complexity of creating, deploying, and managing multiple enterprise portals with a portal framework.

Improvements in efficiency and productivity of employees, customers, and partners with easy-to-find information and services.

The ability to deploy with confidence using a industry-leading platform that helps you get to market faster, build and retain preferred customer relationships, and achieve business agility in today's Internet Economy.

Overall Investment protection with the open and extensible architecture based on Java 2 Enterprise Edition (J2EE) and Enterprise JavaBeans (EJBs).

The invention thus provides a system for web-based personalization, that allows for personalizing the content or business functioning of a web-based application to reflect the characteristics of a particular user of said web-based application, said system comprising: a user profiler, for determining a snapshot of a particular user of a web-based application; a rules editor for inputting a set of rules governing the business functioning of said web-based application; a rules engine, that accepts input from said rules editor and said snapshot of said particular user, and uses said set of rules to make decisions about said particular user and the business functioning of said web-based application; and, a personalization processor that uses the output of said rules engine to determine the content or business functioning of said web-based application as it applies to said particular user.

Additional Features

Additional features provided by various embodiments of the invention include those listed below. It will be evident to one skilled in the art that the following list is presented to illustrate the various features that can be used with the personalization system provided by the invention, and that many modifications and variations will be apparent within the spirit and scope of the invention.

Predictive modeling of a campaign based upon either historical data or current execution data.

Tying campaign/scenario data analysis directly back into the campaign/scenario development environment.

A scenario validation rule: This rule will take the same inputs as the base scenario rules, however its output will be a True or False identifier. True will indicate the user is valid for the scenario and the normal scenario rules should be executed. False will indicate the user is not valid for the scenario and nothing more will occur.

Ad space inventory & scheduling (except indirectly through scenario usage).

Advanced ad conflict resolution, including cross-placeholder resolution (i.e. two placeholders on the same page.

Ad exposure limits.

Email bounced handling.

Guaranteed and verified email delivery.

Email receipts.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for customizing the functionality of a web application, comprising:
    storing a plurality of rules that are independent of a particular user and wherein each rule defines a business functioning, and actions to be taken by a web application in response to a particular event;
    allowing a user to log in and begin a current session at a web application;
    receiving, via an event listener interface at an event service located at the server, notification, from the web application on the server, of events that occur during the current session or after the user has logged in, including events triggered by the user interacting with the web application during the current session, and then associating the events with the profile of a user, to create a snapshot of the user at a point in operation of the application for use with the current session;
    determining a plurality of scenarios wherein each scenario describes a possible series of events that characterize a users' session interactions and can cause one or more of the rules to be triggered, and a plurality of campaigns each of which can be defined by an administrator to have a start and end period during which the campaign is active, and wherein each campaign describes a set of scenarios together with a goal so that they can be collectively activated or deactivated;
    using the snapshot of the user and a set of rules, to make decisions about the user and to determine one of the plurality of scenarios for use with the current session, wherein the rules can be updated and applied to a rules engine without stopping the execution of the rules engine, to effect an immediate change to the business functioning of the web application during the user's session;
    selecting a campaign corresponding to the user, and one of activating or deactivating the campaign once a predefined set of events has been met; and
    using the rules engine with the updated rules to determine, at runtime, the business functioning of the web application, including the actions to be taken by the web application, for the current session and current user only.

2. The method of claim 1 further comprising:
    inputting, via a rules editor, a set of rules governing the business functioning of said web-based application.

3. The method of claim 1 wherein the rules are stored, and can be updated, as XML documents within a rules repository.

4. The method of claim 1 wherein the rules determine actions to be undertaken by the web-based application, and wherein the web-based application is hosted at a personalization server.

5. The method of claim 1 wherein a set of said rules can be grouped together and used to determine a scenario of events to be understood by the web-based application.

6. The method of claim 1, wherein the rules are stored in a rules repository that may be updated, and subsequently parsed by the rules engine, during-runtime, without stopping the execution of the rules engine.

7. The method of claim 6, wherein the rules repository, as updated, is parsed by the rules engine in response to each new event.

8. A method for providing web-based personalization, that allows for personalization of the functioning of a web-based application, comprising the steps of:
    configuring a server to allow a user to access a web application running on the server, and to log in and initiate a session within the web application;
    accessing a plurality of stored rules that are independent of a particular user and that define business functioning of the web application, wherein each rule defines actions to be taken by the web application in response to a particular event;
    listening at an event service located at the server, for notification of events from the web application during a current session or after the user has logged in, including events performed interactively by the user, and associating those events with a user profile, to create a snapshot of the user;
    accessing a plurality of stored scenarios, each of which describe a possible series of events that characterize a users' session interactions and can cause one or more of the rules to be triggered;
    matching the snapshot of the user and the events to determine a particular scenario from the plurality of scenarios for use with the current session, and
    changing, for the current session and current user only, the business functioning of the web-based application, including the actions to be taken by the web application, according to the particular scenario.

9. The method of claim 8, further comprising the step of: storing the rules as XML documents within a rules repository.

10. The method of claim 8, wherein the rules determine actions to be undertaken by the web-based application, and wherein the web-based application is hosted at a personalization server.

11. The method of claim 8, further comprising the step of: grouping a set of said rules together and using the set to determine a scenario of events to be understood by the web-based application.

* * * * *

UNITED STATES PATENT AND TRADEMARK OFFICE
CERTIFICATE OF CORRECTION

| | | |
|---|---|---|
| PATENT NO. | : 7,499,948 B2 | Page 1 of 1 |
| APPLICATION NO. | : 10/122599 | |
| DATED | : March 3, 2009 | |
| INVENTOR(S) | : Smith et al. | |

It is certified that error appears in the above-identified patent and that said Letters Patent is hereby corrected as shown below:

On page 3, in column 1, under "U.S. Patent Documents", line 55, delete "Fomey" and insert -- Forney --, therefor.

On page 4, in column 1, under "Other Publications", line 55, delete "visti:" and insert -- visit: --, therefor.

In column 5, line 6-7, delete "service" and insert -- servlet --, therefor.

In column 11, line 7, delete "bean" and insert -- be an --, therefor.

In column 11, line 61, delete "overtext;" and insert -- over text; --, therefor.

In column 24, line 60-61, delete "inter operability" and insert -- interoperability --, therefor.

In column 28, line 4, in claim 1, delete "user" and insert -- user, --, therefor.

Signed and Sealed this

Eighteenth Day of May, 2010

David J. Kappos
*Director of the United States Patent and Trademark Office*